US012038939B2

(12) United States Patent
Ziemer

(10) Patent No.: US 12,038,939 B2
(45) Date of Patent: Jul. 16, 2024

(54) CONFIGURABLE ONTOLOGY TO DATA MODEL TRANSFORMATION

(71) Applicant: Jurgen Ziemer, Pownal, VT (US)

(72) Inventor: Jurgen Ziemer, Pownal, VT (US)

( * ) Notice: Subject to any disclaimer, the term of this patent is extended or adjusted under 35 U.S.C. 154(b) by 181 days.

(21) Appl. No.: 16/985,414

(22) Filed: Aug. 5, 2020

(65) Prior Publication Data

US 2022/0012426 A1 Jan. 13, 2022

Related U.S. Application Data

(60) Provisional application No. 62/883,767, filed on Aug. 7, 2019.

(51) Int. Cl.
*G06F 16/248* (2019.01)
*G06F 3/0481* (2022.01)
*G06F 3/0484* (2022.01)
*G06F 16/245* (2019.01)

(52) U.S. Cl.
CPC .......... *G06F 16/248* (2019.01); *G06F 3/0481* (2013.01); *G06F 3/0484* (2013.01); *G06F 16/245* (2019.01)

(58) Field of Classification Search
CPC .............................. G06F 16/245; G06F 16/248
See application file for complete search history.

(56) References Cited

U.S. PATENT DOCUMENTS

| | | | | |
|---|---|---|---|---|
| 2008/0147788 A1* | 6/2008 | Omoigui | ................. | G06F 16/90 709/203 |
| 2009/0063983 A1* | 3/2009 | Amidon | ................. | G06N 3/006 715/733 |
| 2012/0016678 A1* | 1/2012 | Gruber | ................. | G06F 40/279 704/E21.001 |
| 2013/0013645 A1* | 1/2013 | Dias | ...................... | G06F 16/367 707/794 |
| 2015/0213151 A1* | 7/2015 | Chang | .................. | G06F 16/288 707/803 |
| 2017/0286456 A1* | 10/2017 | Wenzel | .................. | G16H 10/20 |
| 2022/0253474 A1* | 8/2022 | Acharya | ............. | G06F 16/2438 |

* cited by examiner

*Primary Examiner* — Andrea C Leggett

(57) ABSTRACT

A computer system, storage medium, and method are disclosed for transforming an ontology into a data model. A user may configure transformation rules and ontology to data model mapping.
In the first embodiment, the system comprises components for extraction from a source ontology, transformation into an entity-relationship model, load into particular data modeling tools. Other embodiments comprise an extended configuration, analytics, and user interface component.
The storage medium holds standardized metadata sets for source ontology, a generic entity-relationship model representation, and data modeling tool tool-specific metadata, with machine-readable instructions to self-populate.
The method may use SPARQL to extract ontology metadata, 4GL language to transform ontology into data model metadata sets, and import files or direct access to load metadata into the data modeling tool.
The system, storage medium, and method can operate in reverse, transforming a data model into an ontology.

16 Claims, 23 Drawing Sheets

FIG. 19

CONFIGURABLE ONTOLOGY TO DATA MODEL TRANSFORMATION

TECHNICAL FIELD

This disclosure relates to model-driven engineering, more particularly, to systems for transforming Metadata.

BACKGROUND

Model-driven engineering (MDE) is a software development methodology that exploits models, which are a conceptualization of all topics related to a specific problem, and transforms models into program code.

Data modeling tools are software applications that provide a graphical environment to create Entity-Relationship (E/R) models. The data modeling tool enables a Data Architect to create a conceptual data model (CDM) or Logical Data Model (LDM), transform the model into a Physical Data Model (PDM). Within the tool, the user can generate Structured Query Language (SQL) code from the PDM, and execute the code on a database system to create a schema of tables and other database objects. Widely used data modeling tools referred to in this specification are SAP PowerDesigner (PD), ERWin, IBM InfoSphere Data Architect (IDA), and Sparx Enterprise Architect (EA).

Central to MDE, model transformations are an automated way to generate a target model from a source model. Most data modeling tools can open a native PowerDesigner or ERWin model file and transform it into their proprietary format, Unified Modeling Language (UML), or Extensible Markup Language (XML) Metadata Interchange (XMI). Some enterprise modeling tools such as PowerDesigner or Sparx EA can transform data models into object models and vice Versa.

In information engineering, a domain model is a conceptual model of the domain that defines both data and business rules. An industry-standard model is a domain model for a specific industry or sector. Traditionally, LDM and UML were the preferred notation for industry models. With the rise of semantic technologies, Ontology Web Language (OWL) became the notation of choice for industry and domain models. For example, the Enterprise Data Management Council, a global association of financial institutions, states: The Financial Industry Business Ontology (FIBO) is the industry standard resource for the definitions of business concepts in the financial services industry. (see Enterprise Data Management Council, "A FIBO Primer").

For Data Architects to leverage the industry standard, they need the FIBO or other domain ontologies in their data modeling tool.

Academic research describes the mapping of Relational Database Management Systems (RDBMS) to Resource Description Framework (RDF) and Ontology Web Language (OWL) (see Haw, Wilson May, Subramaniam et al. "Mapping Relational Databases to Ontology Representation: A Review). However, the mapping is unidirectional, not to generate a PDM or database schema from the ontology.

Some modeling tools like Sparx EA and IBM IDA provide an import of RDF/OWL files and subsequent Transformation. (See IBM Support Knowledge center, "Objects, and properties generated from the OWL-to-logical data model transformation" and Sparxsystems, "Sparx Enterprise Architect User Guide—ODM Commands"). However, these data modeling tool imports don't enable the user to change the mapping and transformation rules. In particular, the Transformation does not enable the user to apply a naming standard to generated entity names. In the past, ontologists used UML diagrams to visualize their design. However, RDF/OWL to UML rendition includes anonymous classes that have no use in a data model.

Per default, ontology object properties transform into data model relationships. This Transformation loses Metadata for object properties with particular design patterns. (see, J. Ziemer "Ontology Object Properties are Data Model Associative Entities—not Relationships.")

Traditional transformations parse ontology files. They encounter elements of the ontology and create elements of the data model as they process the source files. The parsing approach reaches its limits with very large ontologies like the FIBO.

The FIBO Data Model made the industry-standard available as an optimal conceptual data model for most data modeling tools (see J. Ziemer, "Financial Industry Business Data Model, (FIB-DM)"). As of this filing, more than seven hundred people downloaded the Open Source version of the data model.

SUMMARY

The Configurable Ontology to Data model Transformation (CODT) transformed the FIBO into FIB-DM. CODT archives the result with a radically different approach.

Rather than parsing source files, CODT uses RDF Query Language (SPARQL) to extract ontology metadata from an ontology platform. CODT transforms ontology metadata into standardized Metadata Sets (MDS), which provide a holistic view of the ontology rather than individual elements of the ontology file. CODT works in set operations rather than procedural algorithms.

Metadata Sets require the user to configure settings for transformation rules and overrides.

A fully configurable transformation depends on metadata sets.

This disclosure describes CODT for engineers skilled in ontologies, data modeling, and programming:

First, the specification provides an overview of the method, metadata sets, and system.

Second, we take the "easy" Transformation of ontology classes from source to target.

Third, the description fully discloses metadata sets and methods and discusses complex transformations of ontology properties, ontology modules, and annotations.

Forth, the specification outlines other embodiments and approaches to implementation.

BRIEF DESCRIPTION OF THE DRAWINGS

FIG. 19 illustrates a sample embodiment of the Configuration settings.

DETAILED DESCRIPTION

Figure 1:
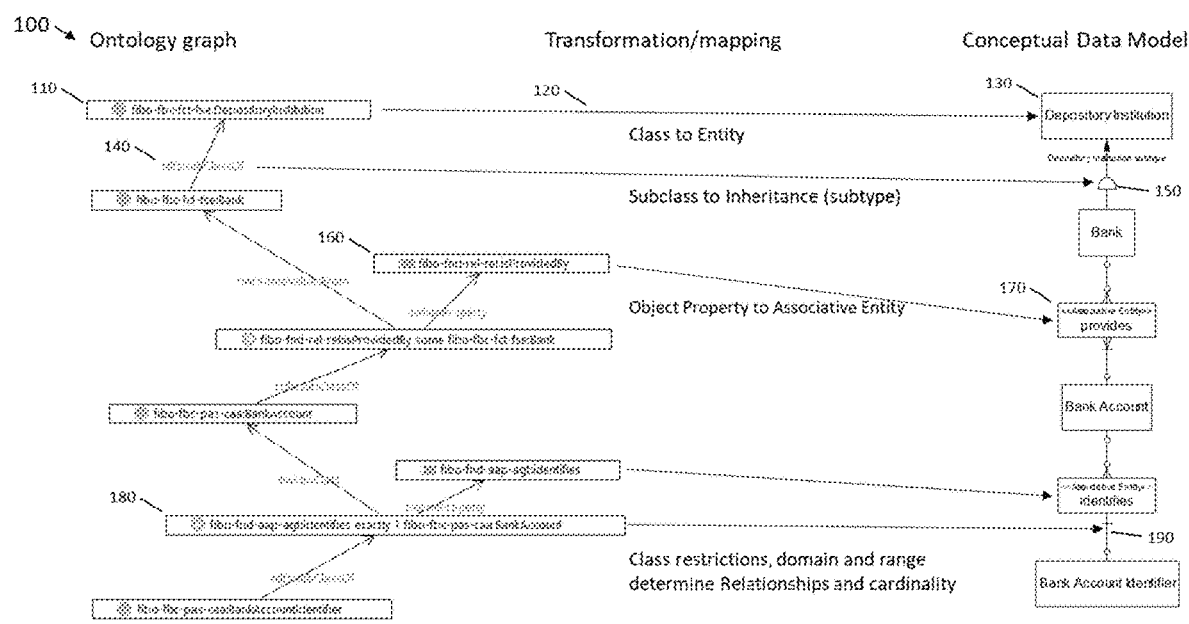
FIG. 1 illustrates the mapping of an example Ontology Graph to the transformed Conceptual Data Model.

FIG. 1 illustrates an example of a source 100 Ontology graph, target PowerDesigner Conceptual Data Model, and the transformation/mapping from source to target. The FIBO example is a Bank, which is a Depository Institution. The Bank provides Bank accounts, which are identified by a Bank Account Identifier.

An ontology class 110, "fibo-fbc-fct-fse:DepositoryInstitution," undergoes a Class to Entity 120 transformation, and becomes a data model entity 130, Depository Institution. Note that the CDM diagram uses Logical Names. The "Camel Case" class Local Name, "DepositoryInstitution," converts to "Depository Institution" with a space inserted.

The "rdfs:subClassOf" property 140 transforms into a Depository Institution subtype symbol 150.

The object property, "fibo-fnd-rel-rel:isProvidedBy" 160 transforms into an Associative Entity, "provides" 170. The default configuration setting, recommended for business domain ontologies, transforms object properties into Associative Entities or PowerDesigner Associations rather than Relationships. A stereotype indicates the select type of data model entity. For example, 170 "<<Associative Entity>> provides.". Also, note that the example object property 160 has a passive name, "isProvidedBy," whereas the data model entity 170 uses the active form, "provides."

The class restriction 180, "fibo-fnd-aap-agt:identifies exactly 1 fibo-fbc-pas-caa:BankAccount" determines the data model relationship 190 from Associative Entity to base entity, and its cardinality.

Figure 2:
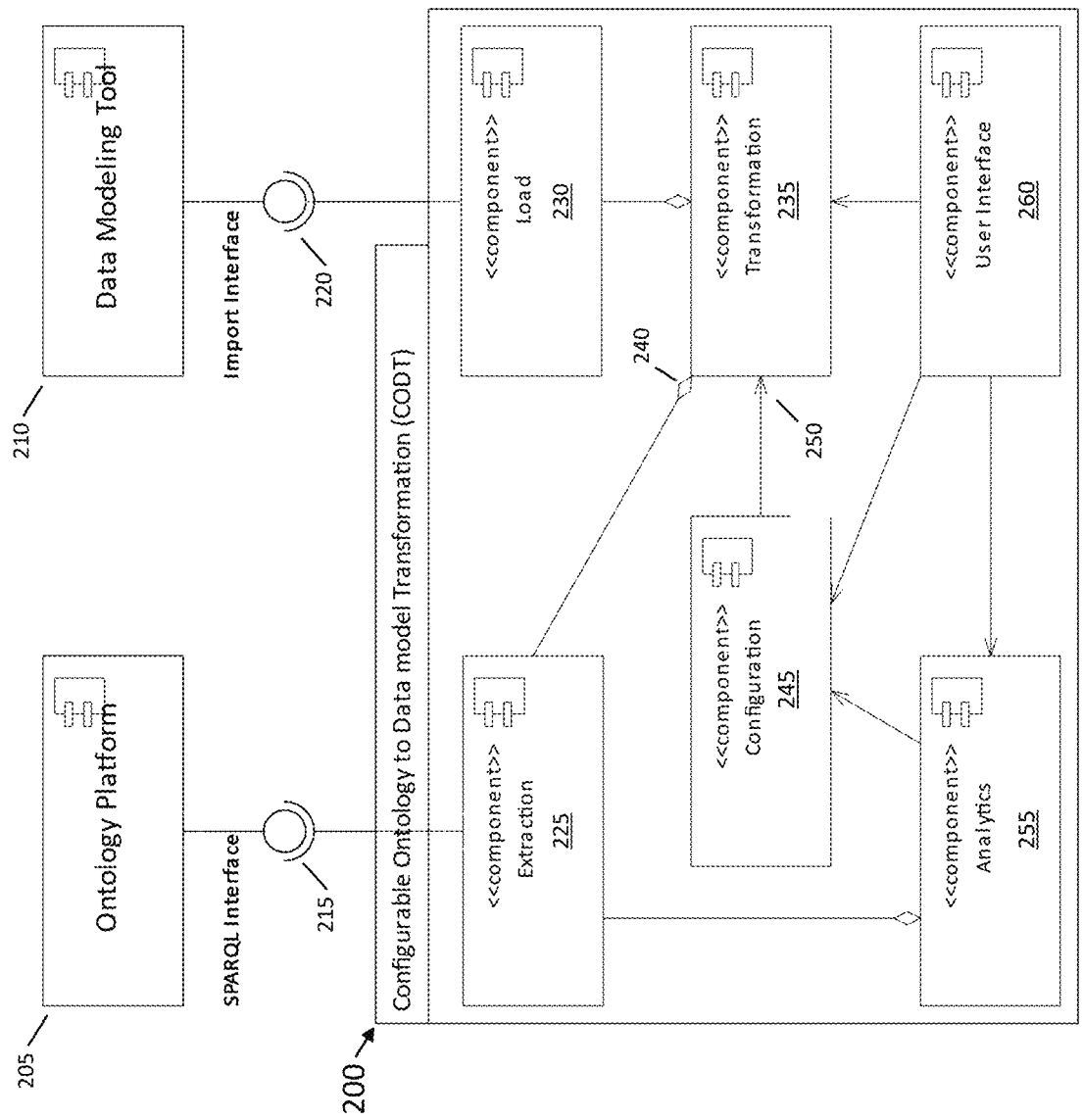
FIG. 2 is a UML Component diagram of the CODT and external systems.

FIG. 2 is a UML component diagram of the CODT system 200 and the two external systems. The Ontology Platform 205 and the Data Modeling Tool 210.

The first embodiment is the core of the CODT system 200, comprising of four computer-executable components, Configuration 245, Extraction 225, Transformation 235, and Load 230. The components are computer-executable because a user or other components can launch computer instructions.

The CODT Working Product or prototype implements the first embodiment as a Microsoft Excel Application on Windows 10. The reference hard and software environment is Windows 10 PC with at least one processor, 32 GB Ram, and at least one fast hard drive or other non-transitory storage medium, MS-Excel 2019, with integrated MS-PowerQuery.

The Excel Application is a possible implementation but by no means the only or preferred embodiment. However, the best way to encode CODT is to build the Excel Application first, and then migrate to other embodiments as needed.

Ontology Platform 205 for this document means an Ontology Editor or Development Platform, or an RDF Database, also known as an RDF or Triple Store. The Ontology Platform has a SPARQL Interface 215 that can process queries and return result sets. In the first embodiment, the SPARQL Interface is part of the User Interface. In other words, the user executes queries on the platform and saves the result sets as Comma-Separated Value (CSV) files. Other embodiments may access the Ontology Platform executing SPARQL metadata queries programmatically via its Application Programming Interface (API).

The Data Modelling Tool 210 must have an Import Interface 220. For example, PowerDesigner has an import for MS-Excel workbooks, Sparx EA has import functionality for CSV files. In the first embodiment, both interfaces for the Ontology Platform and Data Modeling Tool are file-based. Other Data Modeling Tools without model metadata import may provide an API to create model elements programmatically.

The CODT System comprises of six components, Extraction 225, Transformation 235, Load 230, Configuration 245, and the optional User Interface 260 and Analytics 255. In the first embodiment, these components are Excel Workbooks. The Extraction Component 225 converts ontology metadata into Ontology Metadata Sets, validating, cleaning, and normalizing the data. The Ontology Metadata Sets are Excel Sheets in the workbook.

The Transformation Component 235 aggregates the Extraction 225, (as the "diamond" connector shape 240 indicates) and Load 230 components. In other words, Load and Extraction extend the Transformation component. The Transformation Component generates generic Entity-Relationship (E/R) Metadata Sets from the Ontology Metadata Sets or the Extraction component.

The Load Component 230 accesses the E/R Metadata Sets and creates Data Modeling Tool-Specific Metadata Sets. Tool-specific means that formats and model element names are native as required in the Data Modelling tool import specifications. The Data Modeling tool can import these Metadata Sets, the Excel, or CSV files in the first embodiment without further modification.

The Transformation Component 235 uses settings defined in Configuration Component 245. A connector 250 with the "arrow" end means dependency.

Configuration Component 245 contains the configuration settings, a list of tagged values. In the Excel Implementation, this is a sheet of section, parameter, and value. For example, the "Environment" section contains the CODT home directory; The Transformation Section defines the naming rules for the data model elements. A user can configure settings by changing the values.

The User Interface 260 provides a controlled environment for the user to preview and change configuration settings and values in the metadata sets. For example, a wizard may guide less experienced users through configuration settings and launching the ontology to data model transformation.

The Analytics 255 component provides validation of Metadata Sets and reports on the structure of the source ontology. For example, per the default configuration setting, entity names must be unique. The Analytics Component highlights duplicates names so that the user may manually override names, or specify a transformation rule to make the names unique. The ontology annotation report is an example of an analytical query. The analytical query results comprise of annotation properties and their occurrence. The report may present query results to a user, assists the user in deciding which annotation properties to transform in the data model extended properties.

Analytics and User Interface components are optional. Experienced CODT users may prefer to work on the workbooks directly.

All CODT components are computer-executable. In the first embodiment, executable code consists of Excel Formulas, Visual Basic for Applications, and MS-PowerQuery "M" language code.

Figure 3:
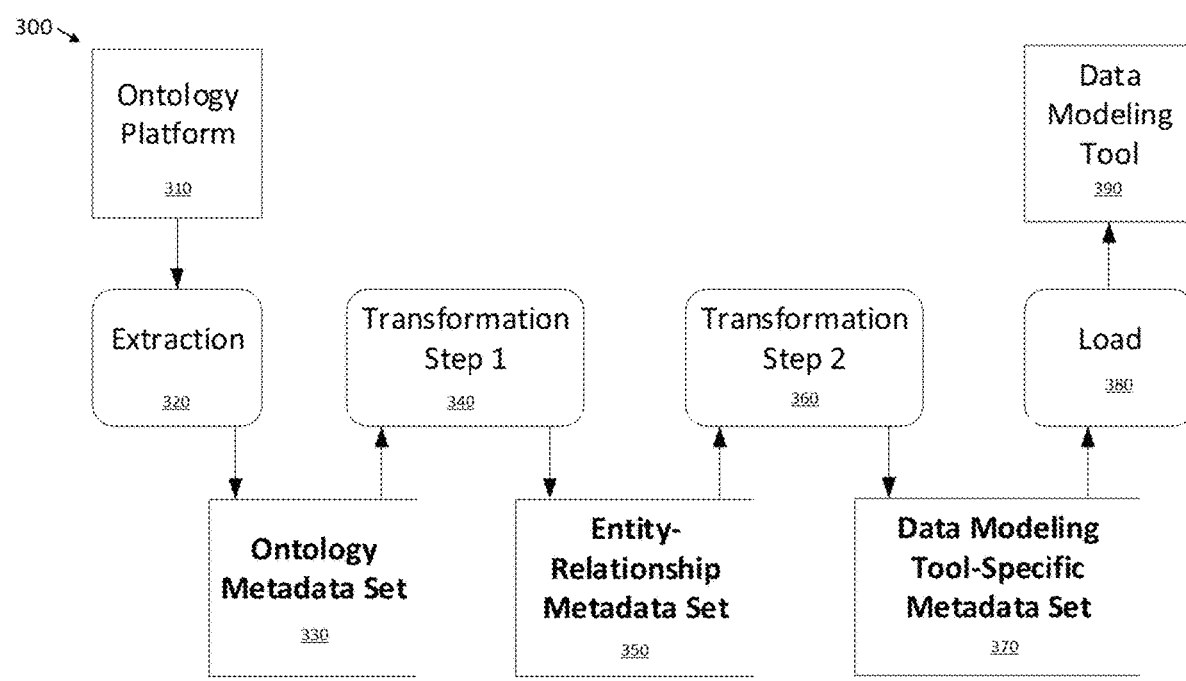
FIG. 3 is a Data Flow Diagram of the Metadata Sets.

FIG. 3 is a Data Flow Diagram (in Gane/Sarson notation) 300 of the Metadata Sets and the external interfaces. The diagram illustrates CODT from the perspective of the non-transitory storage medium.

Metadata is data that provides information about other data. A data set is a collection of data records. As defined herein, a metadata set is a data set for metadata. The CODT metadata sets are coupled with computer instructions that cause the population of the metadata sets, with the non-transitory storage medium storing ontology metadata sets, entity-relationship, tool-specific metadata sets, and the code to populate them.

The Ontology Platform Interface 310 is the same as in the system component diagram FIG. 2, SPARQL Interface 215.

The Extraction Process 320 retrieves ontology metadata and saves it on the non-transitory storage medium as an Ontology Metadata Set 330. In Gane/Sarson notation, the "open rectangle" symbolizes a data store.

A first Transformation Step 340 transforms the Ontology Metadata Set 330 into an Entity Relationship Metadata Set 350. A second Transformation Step 360 transforms the Entity-Relationship Metadata Set into a Data Modeling Tool-Specific Metadata Set 370.

The Load Process 380 takes the Data Modeling Tool-Specific Metadata Set 370, and imports it via the Data Modeling Tool Interface 390, creating the target data model.

In the first embodiment, the non-transitory storage medium may be a local or network drive; the Ontology Metadata Sets are MS-Excel workbook sheets stored on the drive.

In other embodiments, the non-transitory storage medium may extend to a relational database, whereby Metadata Sets serialize as database tables.

Figure 4:
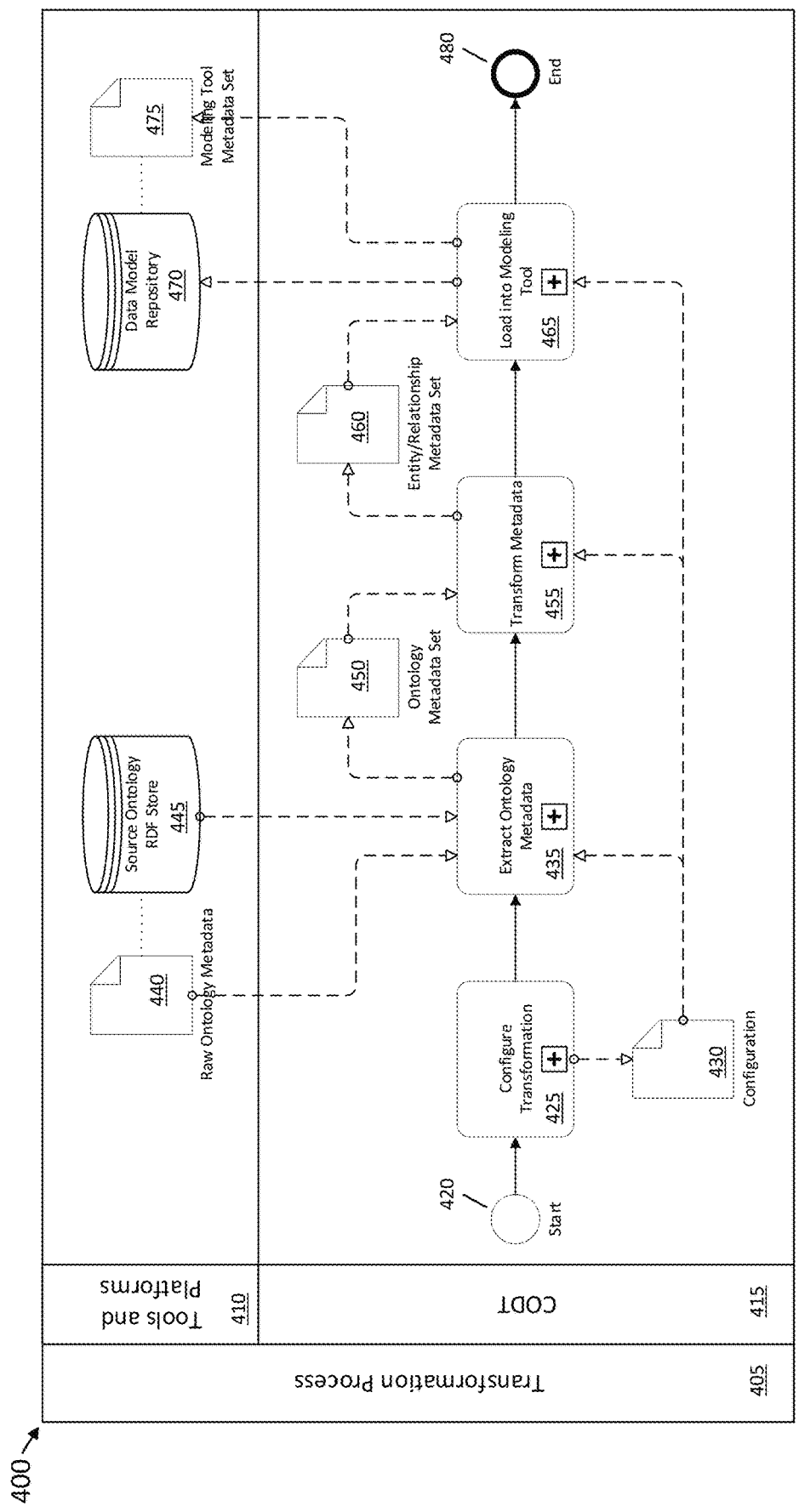
FIG. 4 is a Business Process Modeling Notation (BPMN) diagram of the CODT method.

FIG. 4 is a Business Process Modeling Notation (BPMN) diagram providing an overview of the CODT method 400.

The BPMN Pool is the Transformation Process 405. The BPMN Pool has two Swimlanes, CODT 415, and the external Tools and Platforms 410. Note that the database symbols stand for any external non-volatile storage medium and format, the Source Ontology RDF Store 445 and Data Model Repository 470 may have an underlying database or comprise of files.

The Ontology to Data model Transformation initiates with the Start Event 420. In other words, a user or a batch process starts the CODT Transformation. The Start Event 420 invokes the Configure Transformation task 425. The plus sign, "+" indicates that 425 is a collapsed sub-process, which means that this specification document has a figure and description detailing the sub-process. The Configuration is a user task, where the ontologist or data architect adjusts Configuration settings 430. The Configuration System Component, FIG. 2, 245, implements the configuration process. The output of the process is the Configuration settings 430, stored on the non-transitory storage medium.

The process sequence flows to Extract Ontology Metadata task 435, another collapsed sub-process. The process reads the Configuration settings 430 to determine the ontology metadata source. In the first embodiment, configuration settings simply specify the folder on the non-transitory storage medium that contains "raw" (CSV files of) extracted Ontology Metadata 440. For other embodiments, the process may connect to the Ontology RDF Store 445, a SPARQL Endpoint, and execute metadata queries. The process validates, cleans, and reformats raw metadata and stores it in the standardized Ontology Metadata Set 450.

The sequence flow then invokes the Transform Metadata 455 task, also a collapsed sub-process. The process loads the Ontology Metadata Set 450 and transforms the ontology metadata into generic entity-relationship metadata. Finally, the task creates its output, the Entity/Relationship Metadata Set 460.

The sequence flows to the Load into Modeling Tool task 465. The collapsed sub-process has the Entity/Relationship Metadata Set 460 as its input object. First, the task converts the generic E/R metadata into tool-specific metadata. Modeling tools have different names for data model elements and their properties. For example, the E/R Metadata Set for Subtypes; PowerDesigner calls it Inheritances, and Sparx EA speaks of Generalizations. In the first embodiment, Load into Modeling Tool 465 simply creates the Modeling Tool Metadata Sets 475. These are MS-Excel Workbooks that the user can directly import into PowerDesigner. In other embodiments, the task may directly connect to the API of the Data Modeling Tool or Repository 470 and create the data model. The Transformation Process 405 finishes with the End Event 480.

With ontology classes as an example, this section follows the Transformation from Ontology Platform through the Metadata Sets, and into the data modeling tool, PowerDesigner.

Table 1 shows the Excel Implementation of the first embodiment.

TABLE 1

Example implementation for the first embodiment

| Component | Metadata Set | Excel Workbook |
| --- | --- | --- |
| Extraction | Ontology Metadata | Ontology MDS.xlsx |
| Transformation | Generic ER Metadata | Entity Relationship MDS.xlsx |
| Load | PowerDesigner | PowerDesigner MDS.xlsx |
| Configuration | N/A | Configuration.xlsx |

For example, Excel Workbook, "Ontology MDS.xlsx," implements the Extraction system component, and the Ontology Metadata Sets are sheet in the Ontology MDS workbook.

The user or a batch process executes the following SPARQL query on the Ontology Platform:

```
# Owl Classes.rq
SELECT ?class ?qname ?namespace ?skos_definition
WHERE {
?class a owl:Class.
    BIND(afn:namespace(?class) AS ?namespace).
    FILTER (smf:isBound(?namespace) ).
BIND (smf:qname(?class) AS ?qname ).
OPTIONAL { ?class skos:definition ?skos_definition }
}
```

CODT has query templates for all Ontology Metadata sets. Configuration settings may modify the query for the specific ontology editor or RDF-Store, or transformation settings. In the above example, the default configuration option is to ignore anonymous classes. As a result, only named classes are extracted. For this particular ontology development platform, the query BINDs the Namespace of the class and FILTERs out classes with an unbound namespace.

queries. For example, the Extract_SPARQL folder, not depicted, groups queries to load the CSV files.

The Ontology_MDS sheets constitute the interface of the Load Component. The Transformation Component, the Entity-Relationship MDS, only uses interface sheets as a data source—not intermediate sheets.

Figure 8:
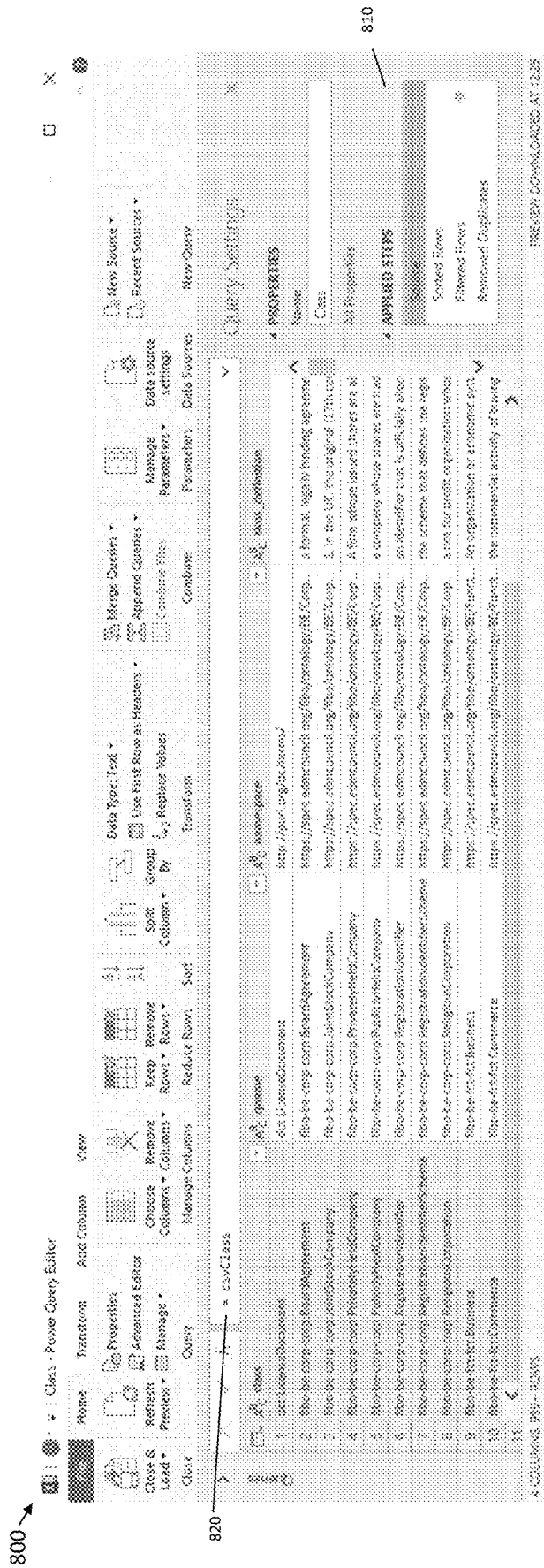
FIG. 8 illustrates a sample embodiment of the Ontology Metadata Set in MS Power Query

FIG. 8 shows the Class query in the PowerQuery Editor 800. The editor is a graphical user interface to select data sources and specify transformation steps 810.

The data source 820 for the Class query is another query, "csvClass," which loads the raw query results.

Below is the "M" language source code listing for the csvClass Power Query:

```
Let
    Source = Csv.Document(File.Contents(CODT_HOME & "\Ontology Source\qrClasses.txt"),[Delimiter="", Columns=4, Encoding=1252, QuoteStyle=QuoteStyle.None]),
    #"Changed Type" = Table.TransformColumnTypes(Source,{{"Column1", type text}, {"Column2", type text}, {"Column3", type text}, {"Column4", type text}}),
    #"Promoted Headers" = Table.PromoteHeaders(#"Changed Type", [PromoteAllScalars=true]),
    #"Renamed Columns" = Table.RenameColumns(#"Promoted Headers",{{"[class]", "class"}})
in
    #"Renamed Columns"
```

An environment variable, CODT_HOME, configured in the configuration settings, specifies the base directory on the non-transitory storage medium. The M-code defines the source CSV file, it's encoding, and the number of columns. The code applies type conversions, promotes the first row as column headers, and renames columns.

The second query populates Class from csvClass:

```
Let
    Source = csvClass,
    #"Sorted Rows" = Table.Sort(Source,{{"class", Order.Ascending}}),
    #"Filtered Rows" = Table.SelectRows(#"Sorted Rows", each [class] <> "owl:Thing" and [class] <> "owl:Nothing" and not Text.StartsWith([class], "dct:")),
    #"Removed Duplicates" = Table.Distinct(#"Filtered Rows", {"class"})
in
    #"Removed Duplicates"
```

Figure 5:
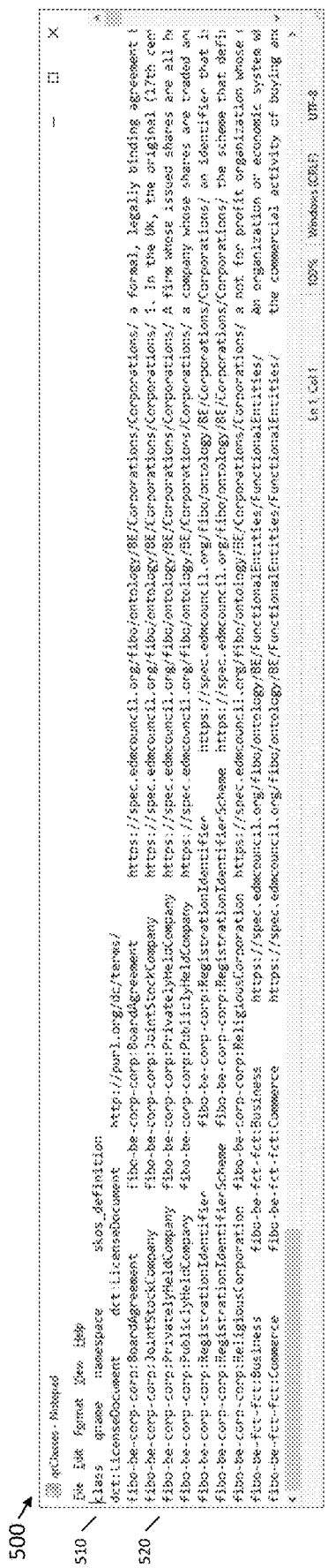
FIG. 5 illustrates a raw ontology extract file in CSV format.

FIG. 5 is a screenshot of the query results in a text editor, Windows Notepad. The CSV file 500 has headings 510 and data 520. SPARQL queries, rather than parsing ontology files, are the performant way to extract ontology metadata for very large ontologies like the FIBO.

Figure 6:
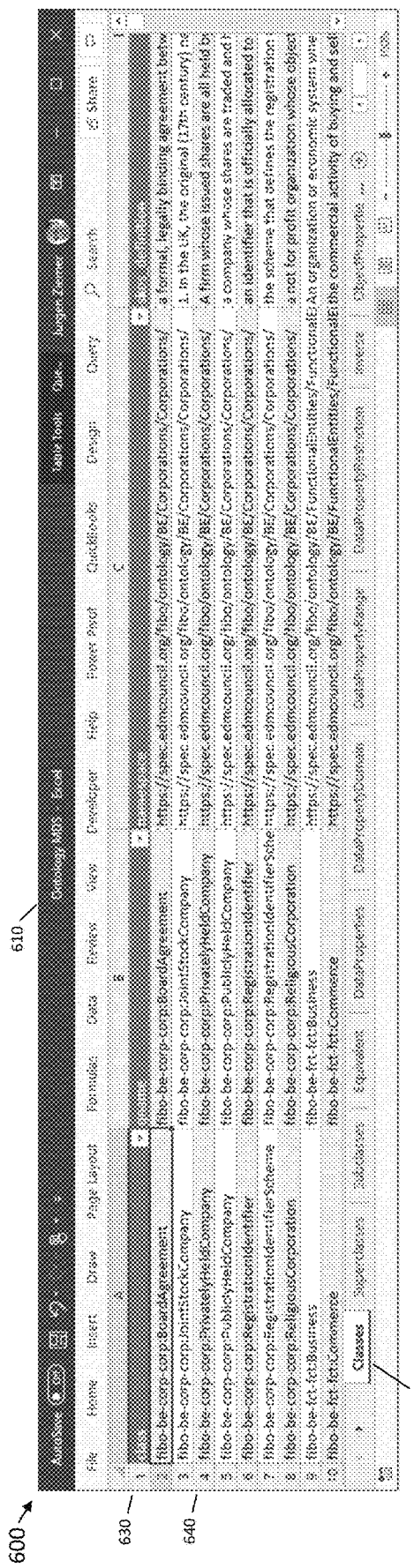
FIG. 6 illustrates a sample embodiment of the Ontology Metadata Set in Microsoft (MS)-Excel

FIG. 6 is an MS-Excel screenshot 600 of the Ontology Metadata Set 610. The format of the Classes sheet 620 is an MS-Excel table, where the first row contains the column headings 630, and the following rows are data 640.

A CODT design principle is that the Metadata Sets are coupled with machine-readable instructions, executable by one or more processors, making the Metadata Sets self-populating. MS-PowerQuery supports this design principle; the machine-readable instructions are M-language code populating the worksheet.

Figure 7:
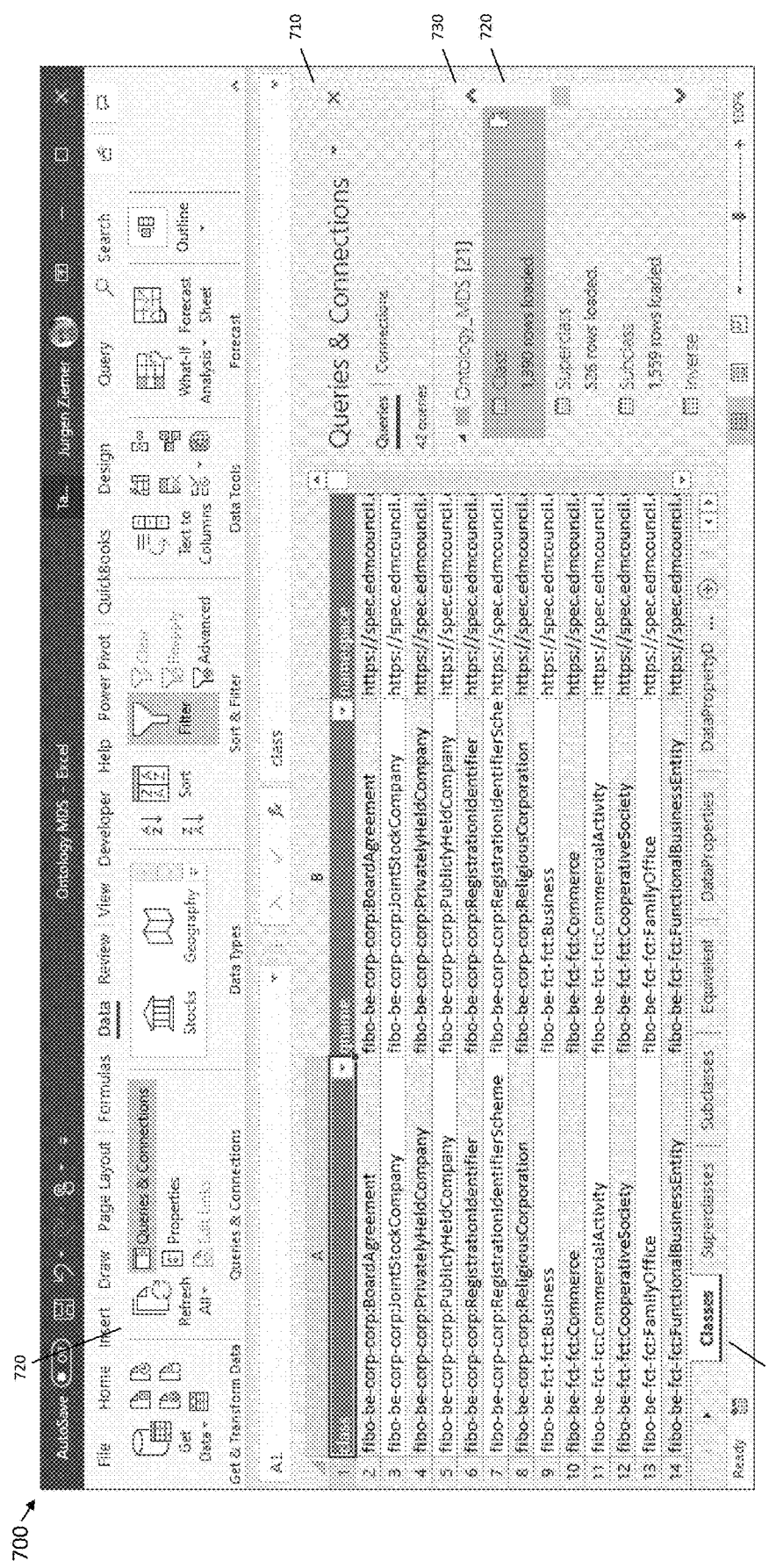
FIG. 7 illustrates a sample embodiment of the Ontology Metadata Set Queries and Connections in MS-Excel

FIG. 7 shows the Classes sheet 700 with the activated the Queries & Connections pane 710. The Classes Sheet 620 has a query Class 720 linked. We can refresh individual queries and update the metadata in the corresponding sheets, or refresh all 720 metadata sets in the workbook. As a recommended convention, CODT groups queries in folders. The Ontology_MDS folder 730 has the queries to populate the "final" metadata sets. Other folders contain intermediate Configuration settings enable the user to exclude ontology modules and classes. In this case, the default excludes the OWL Thing and the Dublin Core Terms (DCT) upper ontology module.

A CODT design principle is to leverage fourth-generation (4GL), declarative languages, to reduce the lines of code. The preferred embodiments use SPARQL and Extract, Transform, Load (ETL) languages like "M."

CODT does not prescribe the number of intermediate Metadata Sets. A team implementing CODT on MS-Excel may choose to combine the M-language scripts and hence bypassing the csvClass PowerQuery and sheet. The recommendation for first-time implementers is to break down the complexity, liberally using intermediate sheets for diagnostic. Once the CODT implementation is well understood and tested, developers may combine queries and reduce the intermediate sheets.

Figure 9:
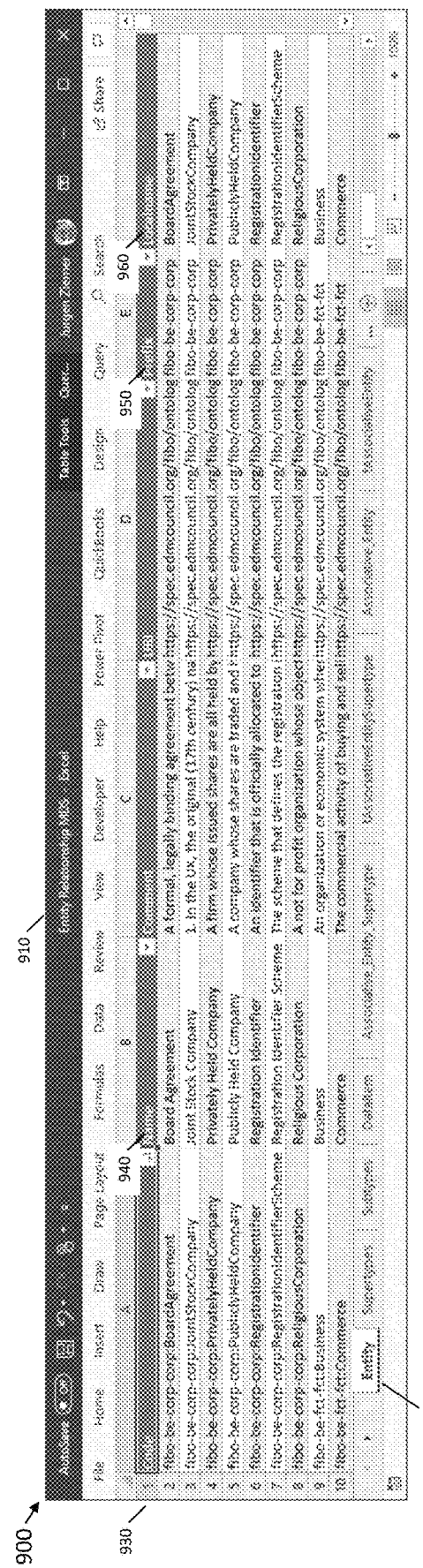
FIG. 9 illustrates a sample embodiment of the Entity-Relationship Metadata Set in MS-Excel

FIG. 9 is a CODT screenshot 900 of the Entity-Relationship MDS 910. The Metadata Set and Object names follow a generic E/R naming standard. The Entity sheet 920 via intermediate sheets has the Ontology MDS Class sheet as a source. This Metadata Set is the data source for Entity in the PowerDesigner, Sparx EA, and other tool-specific Metadata Sets.

Code 930 is a linear transformation, a copy of the class name. There are three derived columns, Name 940, Prefix 950, and Localname 960, the latter break down the Entity Code. The Entity Name 940 is a string conversion of the Localname 960, converting the ontology "Camel Case" naming convention into LDM names (with spaces). Users may specify other conversion rules in the configuration settings.

The M-language code below populates the Entity Metadata Set. The condensed listing does not show repeating instructions for removing, renaming, and reordering columns.

The example highlights how CODT uses set-operations to achieve its results. The first data source is "t_Entity_Name", merged queries "qRestriction" and "qEquivalent" provide additional data model entity properties.

The column renames change class to code and skos_definition to comment.

Data modeling tools have a code and a logical name for model objects. The default configuration setting is to use the ontology element's qualified name, QName, a unique identifier, as the Code 1020. Most data modeling tools have a predefined comment, description, or definition property for model objects. The user can specify a derivation rule to populate that column.

The default configuration setting is to populate the Comment 1030 with the "skos:Definition" annotation property.

Code and Comment are "base" columns—they are direct copies from the Ontology MDS. Prefix 1040, Localname 1050, UnCamel 1060, and Name 1070 are derived values. The Excel implementation derives values with Excel Formulas. For example, column UnCamel 1060 has a formula

```
let
    Source = Excel.CurrentWorkbook( ){[Name="tEntity_Name"]}[Content],
    #"Merged Queries" = Table.NestedJoin(#"Reordered Columns", {"Code"}, qRestriction_Concat,
{"class"}, "qRestriction_Concat", JoinKind.LeftOuter),
    #"Merged Queries1" = Table.NestedJoin(#"Renamed Columns1", {"Code"}, qEquivalent, {"class"},
"qEquivalent", JoinKind.LeftOuter),
    #"Expanded qEquivalent" = Table.ExpandTableColumn(#"Merged Queries1", "qEquivalent",
{"equivalent_class"}, {"qEquivalent.equivalent_class"}),
in
    #"Replaced Value"
```

OWL differentiates between Primitive and Defined classes. Primitive classes have instances asserted via SPARQL CONSTRUCT statements, while an inference engine (a.k.a. Reasoner) infers members of defined classes that match the "owl:equivalentClass" restriction.

A Configuration setting enables the user to specify how CODT transforms defined classes. The default option is to transform them into entities with and "<<equivalent>>" stereotype and to retain the class restriction as an extended attribute for documentation.

Likewise, the "qRestriction" sheet is a concatenation of all restrictions on a particular class, retained for data model documentation.

A recommended naming convention for intermediate tables uses prefixes:

"t" (table) is a sheet with derived columns.

"q" (query) is a sheet that does not add derived values. Query sheets make MS PowerQuery results non-volatile for diagnostic purposes.

Figure 10:
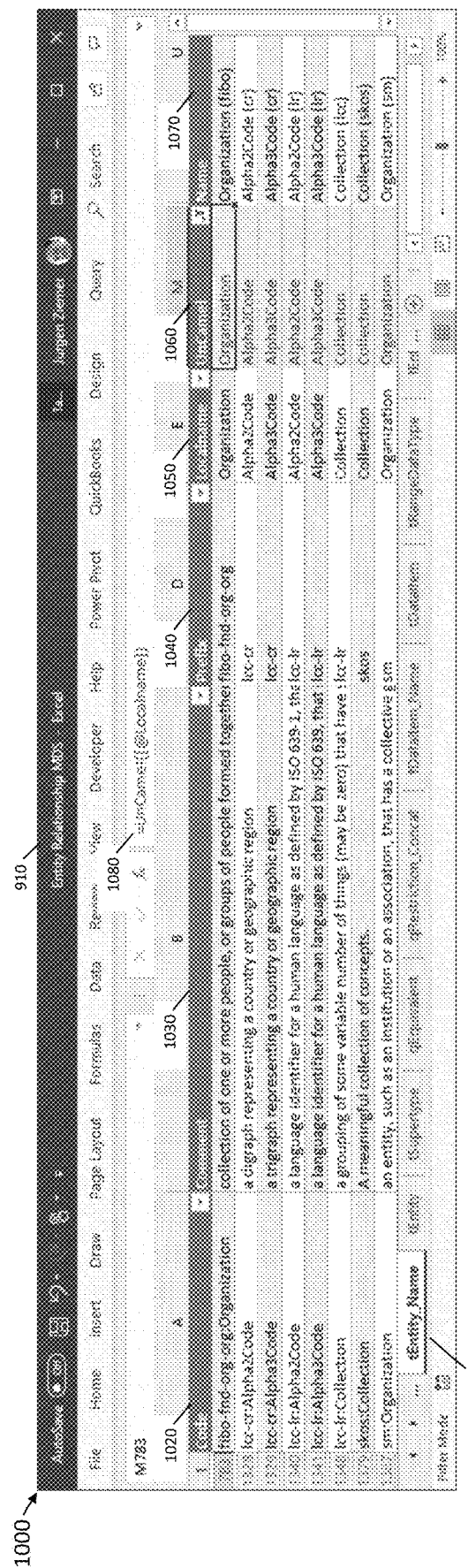
FIG. 10 illustrates a sample embodiment of the Entity-Relationship Metadata Set name transformation in MS-Excel

FIG. 10 is s another screenshot 1000 of the Entity-Relationship MDS 910, showing the tEntity_Name 1010 tab, the data source for Entity.

The M-language code below shows how t_Entity_name populates from the Class Ontology Metadata Set:

1080 to reformat the Localname, inserting spaces between modifiers. Likewise, Prefix 1040 and Localname 1050 derive from the Code 1020, the left/right of the delimiter, to the colon.

Set operations, in M-language, determine the records of a Metadata Set and its base columns—Formulas compute values for derived columns.

Data Modeling tools with an RDF/OWL import function use the ontology class Uniform Resource Identifier (URI) as an Entity name. It should be an enhancement to convert the URI into a logical data model name as above; however, there is a catch. In RDF, the ontology module, the Prefix 1040, is identifying. In other words, duplicate Localnames 1050 are allowed. Most Data Model Naming Standards and Data Modeling tools, however, require both the code and name to be unique across the data model. The simple string conversion, UnCamel 1060, creates invalid entity names.

In CODT, the user must resolve these duplicates, either through manual overwrites or configuring a transformation rule. In the example FIBO transformation, the rule is to append the ontology module code in brackets: Organization becomes Organization (fibo) and Organization (sm).

```
"let
    Source = Ontology_MDS,
    Class_Table = Source{[Item=""Class"",Kind=""Table""]}[Data],
    #""Changed Type"" = Table.TransformColumnTypes(Class_Table,{{""class"", type text}, {""qname"",
type text}, {""namespace"", type text}, {""skos_definition"", type text}}),
    #""Renamed Columns"" = Table.RenameColumns(#""Changed Type"",{{""class"", ""Code""},
{""skos_definition"", ""Comment""}}), #""Removed Columns"" = Table.RemoveColumns(#""Renamed
Columns"",{""qname""}),
    #""Reordered Columns"" = Table.ReorderColumns(#""Removed Columns"",{""Code"", ""Comment"",
""namespace""}),
    #""Sorted Rows"" = Table.Sort(#""Reordered Columns"",{{""Code"", Order.Ascending}})
in
    #""Sorted Rows"""
```

Figure 11:
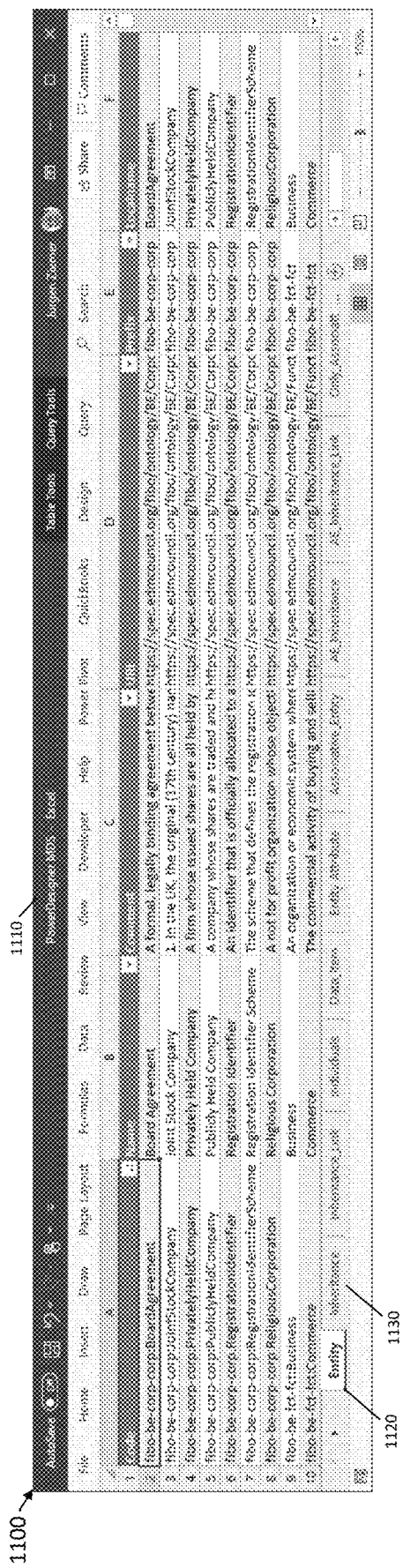
FIG. 11 illustrates a sample embodiment of the Tool-Specific Metadata Set in MS-Excel

FIG. 11 is a screenshot 1100 of the PowerDesigner_MDS in the CODT Excel implementation.

The data modeling tool, SAP PowerDesigner, can directly import this workbook.

The source code below shows a direct copy from the Entity_Relationship_MDS, Entity table, without any transformations:

```
Let
    Source = Entity_Relationship_MDS,
    Entity_Table = Source{[Item="Entity",Kind="Table"]}[Data],
    #"Changed Type" = Table.TransformColumnTypes(Entity_Table,{{"Code", type text}, {"Comment" type text}, {"URI", type text}, {"Prefix", type text}, {"Localname", type text}, {"Name", type text}})
in
    #"Changed Type"
```

While the Entity sheet 1120 is identical to the generic E/R MDS, other sheets reflect the particular "dialect" of the data modeling tool. For example, the Inheritance sheet 1130 is Supertypes in the source Entity-Relationship MDS.

Other data modeling tools may require different formats and object names, for example, Sparx Enterprise Architect imports CSV files. A Sparx_EA_MDS reflects the Sparx dialect, and CODT saves the workbook tabs in delimited text files.

Figure 12:
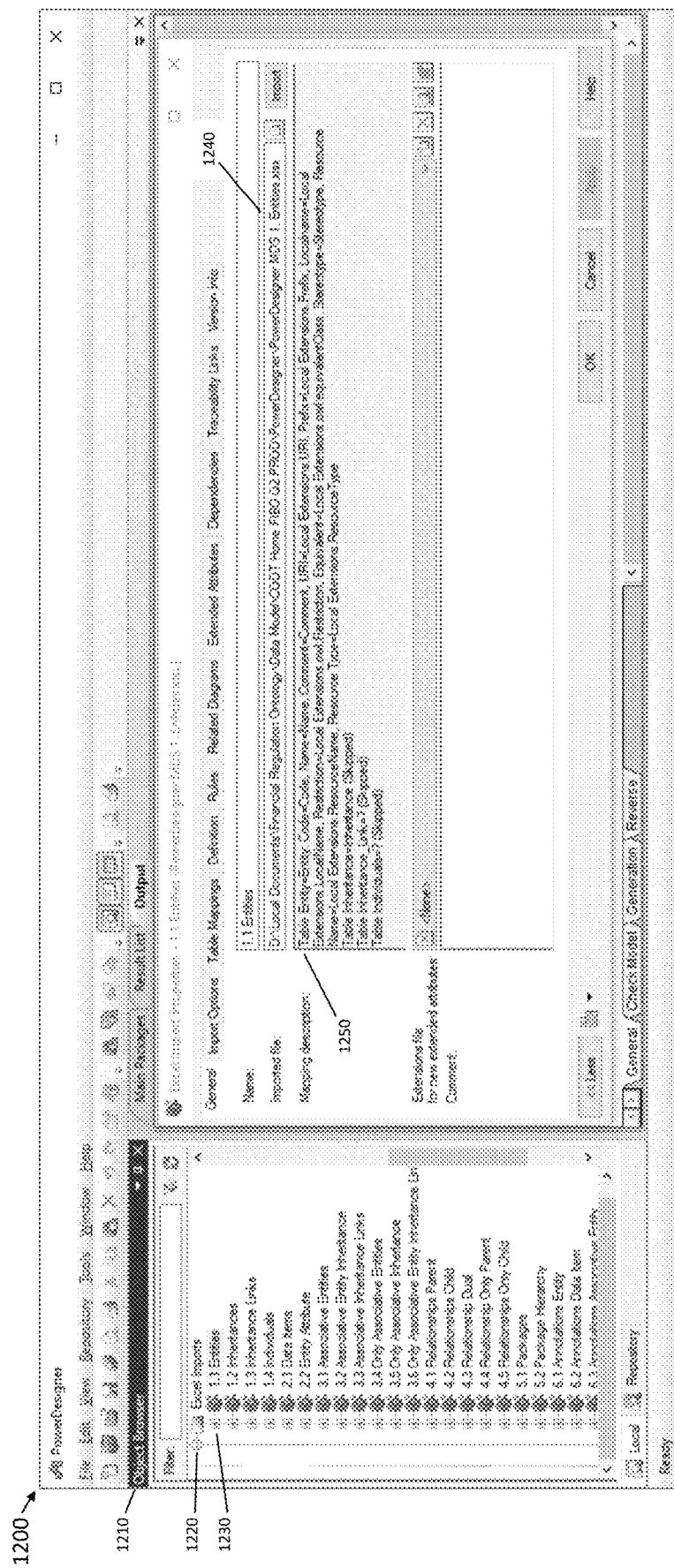
FIG. 12 illustrates the import of sample embodiment tool-specific metadata set into PowerDesigner.

FIG. 12 is a screenshot of the PowerDesigner 1200 data modeling tool. In the first embodiment, the interface between CODT and the data modeling tool is file-based, whereby a user manually loads CODT tool-specific metadata sets into the data modeling tool. The Object Browser 1210 has a folder for Excel Imports 1220; each object is a mapping specification of source PowerDesigner_MDS workbook sheets to data model elements. For example, the Entities 1230 mapping has the CODT tool-specific metadata set 1240 as the Imported File. The Mapping Description 1250 shows that the table Entity equals the Entity data model object, followed by the table column Code equals object property code. The user may extend the PowerDesigner metamodel to provide extended properties for annotations selected in the CODT configuration. For example, the Mapping Description 1250, shows column URI equals "Local Extensions.URI", a PowerDesigner Extended Attribute.

The best way of implementation is to follow the object names of the target data modeling tool, the dialect when designing a CODT tool-specific metadata set.

Figure 13:
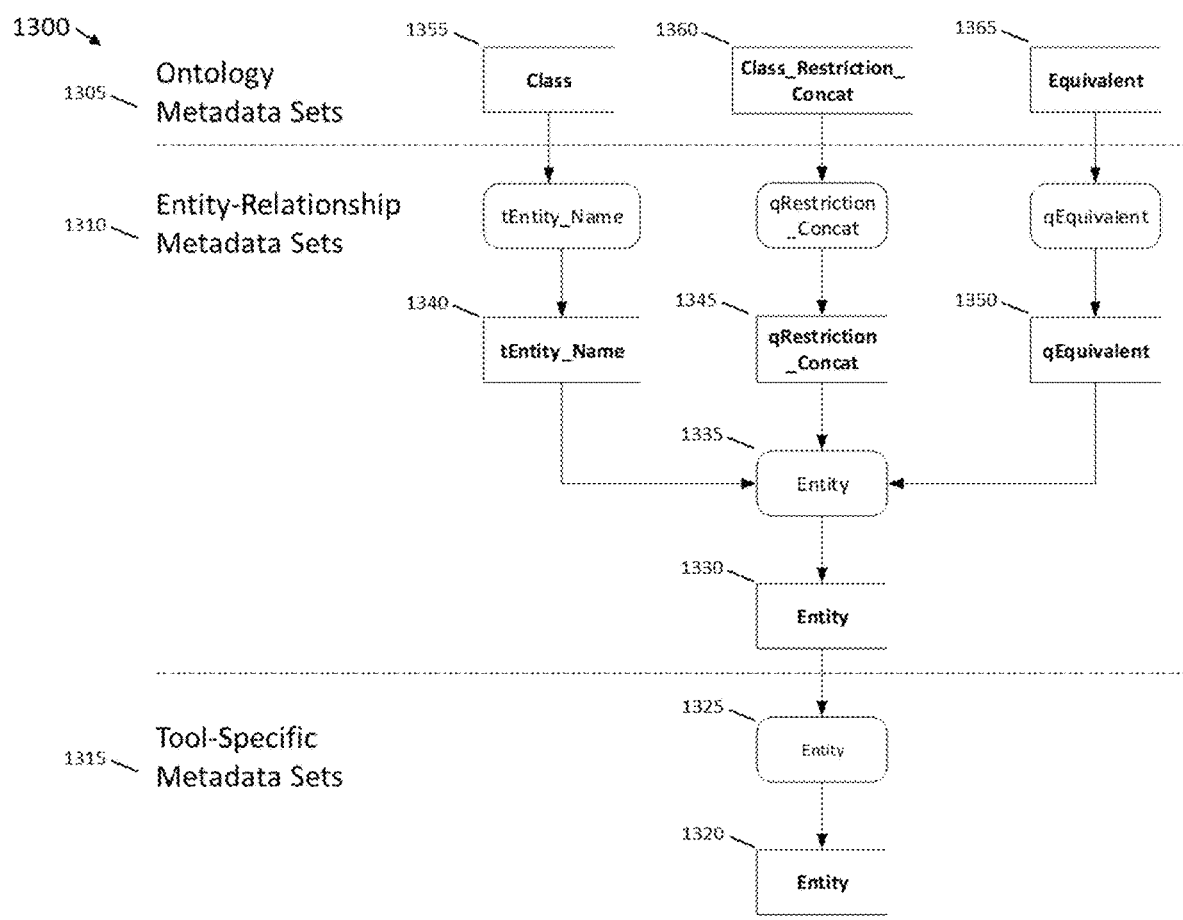
FIG. 13 is a Data Flow Diagram of the Class metadata set population.

FIG. 13 is a data flow diagram to recap the Metadata Set transformation 1300 from an ontology to a data model. The horizontal lines delineate Ontology 1305, Entity-Relationship 1310, and Tool-Specific Metadata Sets 1315. This logical view of data sets and code on the non-transitory storage device is independent of the particular implementation. To emphasize the self-populating nature of the metadata sets, we start with the outcome; the tool-specific Entity Metadata Set 1320. A like-named process 1325 populates the data set from the E/R Metadata Set 1330. The process to populate the E/R Entity Metadata Set 1335 is a merge of three intermediate metadata sets: tEntity_Name 1340, qRestriction_Concat 1345, and qEquivalent 1350. The metadata sets populate from three Ontology Metadata Sets, Class 1355, Class_Restriction_Concat 1360, and Equivalent 1365.

The next section of this specification examines the Metadata Sets in detail. For some metadata sets, the description includes a table listing the columns and the population SPARQL query, to introduce new transformation concepts or techniques.

Figure 14:
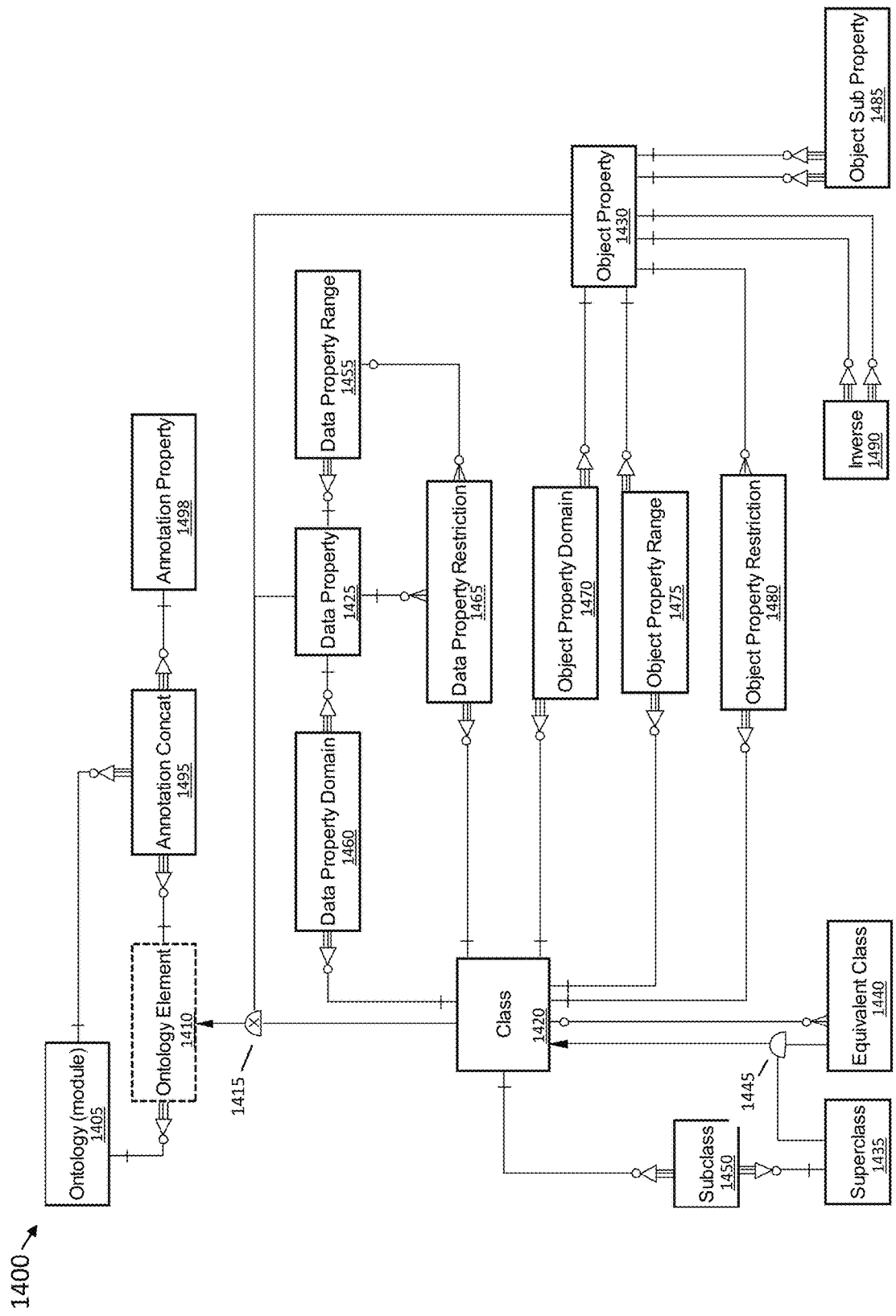
FIG. 14 is a Logical Data Model (LDM) diagram of the Ontology Metadata Sets.

FIG. 14 is an entity-relationship diagram, a logical data model of the Ontology Metadata Sets 1400. The diagram depicts metadata sets as entities, and the relationships specify data dependencies between the metadata sets. Note that the Excel naming convention for sheets is plural, but the diagram uses singular, the logical data model naming convention.

The Ontology Metadata Sets are not a normalized metamodel for RDF/OWL. They are a staging area as in Extract, Transform Load (ETL) data warehousing architecture. The example diagrams, tables, and queries describe the working product transforming domain ontologies. Developers with different tools or source ontologies may choose a different layout of the metadata sets.

The MS-Excel implementation validates the data dependencies with consistency checks. For example, the Object Property Domain 4010 metadata set must have a domain that is identifying a record in Class 4015. For embodiments, hold the metadata sets as database tables on the non-transitory storage medium, the logical data model is the blueprint for the physical model and schema. For embodiments that use an object-oriented programming language rather than Excel to implement CODT, developers can transform the entity-relationship model into a UML Class Model.

The Ontology (module) 1405 comprises of code, Prefix, Namespace, and annotation properties. For this specification, the Ontology module means an individual graph or file (owl:Ontology). Many modules comprise an ontology like the FIBO.

The Ontology Element 1410 is the supertype 1415 for Class 1420, Data Property 1425, and Object Property 1430.

The dotted line around the Ontology Element 1410 indicates a logical-only entity or abstract class in an object model. The Excel implementation does not populate a workbook sheet for Ontology Element—only for its subtypes.

The Class 1420 metadata set contains all classes of the ontologies.

Table 2 list the column Name and sample record. The Key column in Table 2 indicates that the values in this column are Primary Key (PK) or Alternate Key (AK).

TABLE 2

Classes Metadata Set

| Key | Name | Sample record |
|-----|------|---------------|
| PK  | class | fibo-be-corp-corp:BoardAgreement |
| AK  | qname | fibo-be-corp-corp:BoardAgreement |
| AK2 | namespace | |
| | | https://spec.edmcouncil.org/fibo/ontology/BE/Corporations/Corporations/ |
| | skos_definition | a formal, legally binding agreement between members of the Board of Directors of the organization |

The Class can be a Superclass 1435, Equivalent Class 1440, or both, as the inclusive subtype symbol 1445 indicates.

Table 3 shoes the Equivalent MDS comprising of the class and OWL equivalent expression.

TABLE 3

| | Equivalent Metadata Set | |
|---|---|---|
| Key | Name | Sample record |
| PK | class | fibo-be-le-lei:LEIRegisteredEntity |
| | equivalent_class | lcc-lr:isIdentifiedBy some fibo-be-le-lei:LegalEntityIdentifier |
| | equivalent_type | Restriction |

The equivalent_type indicates whether the equivalent is a class restrictions or an alias (a single class).

The SPARQL query populates the metadata set joining the owl:equivalentClass property.

```
SELECT ?class ?equivalent_class ?equivalent_type
WHERE {
   ?class a owl:Class .
    BIND(afn:namespace(?class) AS ?namespace) .
   FILTER (smf:isBound(?namespace)) .
   ?class owl:equivalentClass ?equivalent_class
    BIND(afn:namespace(?equivalent_class) AS ?equiv_ns) .
    BIND ((IF(smf:isBound(?equiv_ns), "Class", "Restriction")) AS ?equivalent_type)
}
```
Superclass 1435 only has two columns, the class and an indicator for exclusiveness.

The SPARQL query selects classes that have subclasses via the RDF Schema (RDFS) rdfs:subClassOf property.

```
SELECT DISTINCT ?parent ?is_exclusive
WHERE {
    ?parent a owl:Class .
    BIND(afn:namespace(?parent) AS ?namespace) .
    FILTER (smf:isBound(?namespace)) .
    ?class1 rdfs:subClassOf ?parent .
    OPTIONAL {
    ?class1 owl:disjointWith ?class2 .
    ?class2 rdfs:subClassOf ?parent .
    BIND(smf:isBound(?class2) AS ?is_exclusive)
    }
}
```

The query examines owl:disjointWith property to set the is_exclusive indicator. OWL semantics define disjointness as a relationship between two subclasses, whereas the entity-relationship model exclusive/inclusive applies for all sub-types.

The Subclass 1450 metadata set has two columns, super-class, and subclass.

The Data Property 1425 metadata set comprises of columns shown in Table 4.

TABLE 4

| | Data Property Metadata Set | |
|---|---|---|
| Key | Name | Sample record |
| PK | data_property | fibo-be-le-lei:hasOwnershipPercentage |
| AK | qname | fibo-be-le-lei:hasOwnershipPercentage |
| | namespace | |
| AK2 | | https://spec.edmcouncil.org/fibo/ontology/BE/LegalEntities/LEIEntities/ |
| | skos_definition | the percentage ownership interest in the owned entity owned by owning entity, if known |

TABLE 4-continued

| | Data Property Metadata Set | |
|---|---|---|
| Key | Name | Sample record |
| | range | xsd:decimal |
| | parent_property | fibo-be-le-lei:isQuantifiedBy |

Data model attributes do not support the RDFS semantic of sub-properties. Hence the value in parent_property is a simple concatenation of parent properties retained for data model documentation. The range column refers to the Data Property Range 1455 metadata set, which has a distinct list of XML Schema Definition (XSD) datatypes used in the ontology.

Data Property Domain 1460 associates a Data Property 1425 with a Class 1420.

Data Property Restriction 1465 is another way in OWL to associate a Class with Data Properties.

Table 5 shows the columns of the metadata set.

TABLE 5

| | Data Property Restriction Metadata Set | |
|---|---|---|
| Key | Name | Sample record |
| PK, AK | class | fibo-fbc-fct-breg:StandardIndustrialClassificationCode |
| PK | property | fibo-fnd-rel-rel:hasTag |
| AK | restr | fibo-fnd-rel-rel:hasTag exactly 1 xsd:string |
| | some_values | |
| | all_values | |
| | card | |
| | min_card | |
| | max_card | |
| | has_value | |
| | qual_card | 1 |
| | min_qual_card | |
| | max_qual_card | |

TABLE 5-continued

Data Property Restriction Metadata Set

| Key | Name | Sample record |
|---|---|---|
| | data_range | xsd:string |
| | minimum_cardinality | 1 |

Columns class, property, and restr uniquely identify a record. The restriction (restr) is a string of the class restriction (owl:Restriction). The remaining columns decompose the class restriction. The Entity-Relationship MDS uses this information to determine mandatory attributes, where possible.

Note: RDF/OWL is "Open World"—data properties are multi-valued unless constrained. The above example, Standard Industry Classification Code, has a qualified cardinality (qual_card) of 1. For example, there must be only one code, "3572" for Computer Storage Devices. However, not all data properties are constrained. The default configuration setting transforms all data properties into data model attributes on an entity. The default transformation does not create new entities for unconstrained data properties.

The SPARQL query selects the metadata set columns.

```
SELECT ?class ?property ?restr ?some_values ?all_values ?card ?min_card ?max_card ?has_value
?qual_card ?min_qual_card ?max_qual_card ?data_range
WHERE {
    ?class a owl:Class .
      BIND(afn:namespace(?class) AS ?class_namespace) .
    FILTER (smf:isBound(?class_namespace)) .
    ?class rdfs:subClassOf ?restr .
    ?restr a owl:Restriction .
    ?restr owl:onProperty ?property.
    ?property a owl:DatatypeProperty
    OPTIONAL {?restr owl:onDataRange ?data_range }
    OPTIONAL {?restr owl:someValuesFrom ?some_values }
    OPTIONAL {?restr owl:allValuesFrom ?all_values }
    OPTIONAL {?restr owl:cardinality ?card }
    OPTIONAL {?restr owl:minCardinality ?min_card }
    OPTIONAL {?restr owl:maxCardinality ?max_card }
    OPTIONAL {?restr owl:hasValue ?has_value}
    OPTIONAL {?restr owl:maxQualifiedCardinality ?max_qual_card }
    OPTIONAL {?restr owl:minQualifiedCardinality ?min_qual_card }
    OPTIONAL {?restr owl:qualifiedCardinality ?qual_card }
}
```

The "OPTIONAL" keyword leaves the variable unbound, but returns a record if the property restriction is not present.

Object Property 1430 is the essential Ontology Element, besides the Class. Table 5 shows the columns of the metadata set.

TABLE 5

Object Property Metadata Set

| Key | Name | Sample record |
|---|---|---|
| PK | object_property | lcc-lr:identifies |
| AK | Qname | lcc-lr:identifies |
| AK2 | namespace | |
| | skos_definition | https://www.omg.org/spec/LCC/Languages/LanguageRepresentation/recognizes or establishes within some context |
| | functional | FALSE |
| | inverse_functional | FALSE |

Functional and inverse_functional are indicators for the OWL properties. The SPARQL query selects the columns and binds the OPTIONAL triplets to the respective variables.

```
SELECT ?object_property ?qname ?namespace ?skos_definition ?functional ?inverse_functional
WHERE {
    ?object_property a owl:ObjectProperty .
       BIND(afn:namespace(?object_property) AS ?namespace) .
       BIND (smf:qname(?object_property) AS ?qname ) .
    OPTIONAL {?object_property skos:definition ?skos_definition } .
    OPTIONAL { ?object_property a owl:FunctionalProperty
        BIND ("TRUE" AS ?functional)
    }
    OPTIONAL { ?object_property a owl:InverseFunctionalProperty
        BIND ("TRUE" AS ?inverse_functional)
    }
}
ORDER BY ASC((?qname))
```

In the default configuration, CODT transforms an Object Property into an Associate Entity. The three Ontology MDS, Object Property Domain 1470, ObjectProperty Range 1475, and Object Property Restriction 1480 are linking Class 1420 to Object Property 1430.

Table 6 defines the Object Property Domain MDS with the expected columns object_property and domain_class.

TABLE 6

Object Property Domain Metadata Set

| Key | Name | Sample record |
| --- | --- | --- |
| PK, AK | object_property | fibo-fbc-fct-ra:registers |
| PK | domain_expression | fibo-fbc-fct-ra:RegistrationAuthority or fibo-fbc-fct-ra:Registrar |
| AK | domain_class | fibo-fbc-fct-ra:Registrar |

RDF/OWL allows more than one value specified for the domain. In the above example, a Registrar or Registration Authority registers something. The ontology file, in Turtle notation, defines the object property as:

```
fibo-fbc-fct-ra:registers
    rdf:type owl:ObjectProperty ;
    rdfs:comment "QName: fibo-fbc-fct-ra:registers" ;
    rdfs:domain [
        rdf:type owl:Class ;
        owl:unionOf (
            fibo-fbc-fct-ra:RegistrationAuthority
            fibo-fbc-fct-ra:Registrar
        );
    ];
    rdfs:isDefinedBy fibo-fbc-fct-ra: ;
    rdfs:label "registers" ;
    owl:inverseOf fibo-fbc-fct-ra:isRegisteredBy ;
    skos:definition "records something in a registry or archive" ;
.
```

Hence, both object_property and domain_class constitute a unique key of the metadata set. The domain_expression is the full text of the domain, retained for documentation.

The SPARQL code populates the metadata set:

The expression in the OPTIONAL clause decomposes the owl:unionOf into multiple records.

The example illustrates why the preferred embodiments use SPARQL rather than parsing textfiles to extract ontology metadata. A few lines of 4GL code populate the data set.

Object Property Range 1475 follows the same MDS structure and SPARQL query.

Object Property Restriction 1480 links object properties to classes with cardinalities.

Table 7 shows a similar structure to the Data Property Restriction metadata set.

TABLE 7

Object Property Restriction Metadata Set

| Key | Name | Sample record |
| --- | --- | --- |
| PK, AK | class | fibo-fnd-pas-pas:CustomerIdentifier |
| PK | restr | lcc-lr:identifies exactly 1 fibo-fnd-pas-pas:Customer |
| AK | object_property | lcc-lr:identifies |
|  | some_values |  |
|  | all_values |  |
|  | card |  |
|  | min_card |  |
|  | max_card |  |
|  | has_value |  |
|  | has_value_class |  |
|  | max_qual_card |  |
|  | max_qual_class |  |
|  | min_qual_card |  |
|  | min_qual_class |  |
|  | qual_card | 1 |
|  | qual_class | fibo-fnd-pas-pas:Customer |

The sample record states that a Customer Identifier identifies exactly one Customer. Columns class and restr constitute a unique key on the data set, as well as class and object_property.

The SPARQL query is similar to the object property restriction:

```
SELECT ?object_property ?domain_expression ?domain_class
WHERE {
    ?object_property a owl:ObjectProperty .
    ?object_property rdfs:domain ?domain_expression
    OPTIONAL {?object_property rdfs:domain/(owl:unionOf/rdf:rest*/rdf:first)* ?domain_class .
        FILTER (isURI(?domain class)) }
}
```

```
SELECT ?class ?restr ?obj_prop ?some_values ?all_values ?card ?min_card ?max_card ?has_value
?has_value_class ?max_qual_card ?max_qual_class ?min_qual_card ?min_qual_class ?qual_card
?qual_class
WHERE {
    ?class a owl:Class.
      BIND(afn:namespace(?class) AS ?class_namespace).
    FILTER (smf:isBound(?class_namespace)).
    ?class rdfs:subClassOf ?restr.
    ?restr a owl:Restriction .
    ?restr owl:onProperty ?obj_prop.
    ?obj_prop a owl:ObjectProperty
    OPTIONAL {?restr owl:someValuesFrom/(owl:unionOf/rdf:rest*/rdf:first)* ?some_values
          BIND(afn:namespace(?some_values) AS ?some_values_ns )
          FILTER (smf:isBound(?some_values_ns))
    }
    OPTIONAL {?restr owl:allValuesFrom/(owl:unionOf/rdf:rest*/rdf:first)* ?all_values
          BIND(afn:namespace(?all_values) AS ?all_values_ns )
          FILTER (smf:isBound(?all_values_ns))
    }
    OPTIONAL {?restr owl:cardinality ?card }
    OPTIONAL {?restr owl:minCardinality ?min_card }
    OPTIONAL {?restr owl:maxCardinality ?max_card }
    OPTIONAL {?restr owl:hasValue ?has_value .
             ?has_value a ?had_value_class }
    OPTIONAL {?restr owl:maxQualifiedCardinality ?max_qual_card .
         ?restr owl:onClass/(owl:unionOf/rdf:rest*/rdf:first)* ?max_qual_class.
           BIND(afn:namespace(?max_qual_class) AS ?max_qual_class_ns )
           FILTER (smf:isBound(?max_qual_class_ns))
    }
    OPTIONAL {?restr owl:minQualifiedCardinality ?min_qual_card .
         ?restr owl:onClass/(owl:unionOf/rdf:rest*/rdf:first)* ?min_qual_class .
           BIND(afn:namespace(?min_qual_class) AS ?min_qual_class_ns )
           FILTER (smf:isBound(?min_qual_class_ns))
    }
    OPTIONAL {?restr owl:qualifiedCardinality ?qual_card .
         ?restr owl:onClass/(owl:unionOf/rdf:rest*/rdf:first)* ?qual_class .
           BIND(afn:namespace(?qual_class) AS ?qual_class_ns )
           FILTER (smf:isBound(?qual_class_ns))
    }
}
```

Again the OPTIONAL keyword decomposes the class restriction into separate columns and the owl:unionOf expression returns individual records for owl:onClass.

RDFS enables the ontologist to define property hierarchies. The Object Sub Property 1485 metadata set has two columns, referencing two object properties. Sub_property and parent_property. The SPARQL query selects object properties matching rdfs:subPropertyOf.

Properties have a direction, from domain to range. As beforementioned, the Customer Identifier identifies a Customer. The inverse property, owl:inverseOf defines the relation in the opposite direction: Customer is identified by a Customer Identifier. The construct enables the ontologist to define aliases and to specify restrictions on both classes.

An ontology to data model transformation must merge inverse object properties into a single associative entity.

The Inverse 1490 metadata set has two key attributes referring to the Object Property 1425. The SPARQL query selects object properties matching owl:inverseOf.

Several upper ontologies, like the Simple Knowledge Organization System (SKOS) and Semantic Metadata (SM), define standard annotation properties to document ontologies.

Annotation Concat 1495 associates an Ontology Element 1410 with specified Annotation Properties 1498. Table 8 specifies the metadata set:

TABLE 8

Annotation Concat Metadata Set

| Key | Name | Sample record |
|---|---|---|
| PK | annotation_property | sm:copyright |
|  | object_type | owl:Ontology |
| PK | object_code | fibo-be-corp-corp |
|  | annotation_concat | Copyright (c) 2013-2020 EDM Council, Inc. |
|  |  | Copyright (c) 2013-2020 Object Management Group, Inc. |

The sample record shows the copyright annotation property on the FIBO Business Entities Corporations ontology module (fibo-be-corp-corp).

The annotation value lists the EDM Council and the Object Management Group as copyright holders. The object_type specifies whether the object_code is an ontology module, class, data, or object property.

The SPARQL query selects the four columns of the metadata set.
SELECT DISTINCT ?annotation_property ?object_type ?object ?annotation
WHERE {
    ?annotation_property a owl:Annotation Property .
    ?object ?annotation_property ?annotation .
    ?object a ?object_type .
    FILTER (?object_type IN(owl:Class, owl:Ontology, owl:DatatypeProperty, owl:ObjectProperty))
}

The caveat is that annotation properties are multi-valued. Hence, the above query returns two rows, EDM Council and Object Management Group. Annotation properties transform to PowerDesigner Extended Attributes (a.k.a. Tagged Values or User Defined Properties in other modeling tools), which are single-valued. Therefore, the M-language code below groups and concatenates the annotations:

Let
    Source = Excel.CurrentWorkbook( ){[Name="csvAnnotation"]}[Content],
    #"Removed Columns" = Table.RemoveColumns(Source,{"object"}),
    #"Reordered Columns" = Table.ReorderColumns(#"Removed Columns",{"annotation_property", "object_type", "object_code", "annotation"}),
    #"Grouped Rows" = Table.Group(#"Reordered Columns", {"annotation_property", "object_type", "object_code"}, {{"Group_Annotation", each _, type table [annotation_property=text, object_type=text, object_code=text, annotation=text]}}),
    #"Added Custom" = Table.AddColumn(#"Grouped Rows", "List_Annotation", each [Group_Annotation][annotation]),
    #"Extracted Values" = Table.TransformColumns(#"Added Custom", {"List_Annotation", each Text.Combine(List.Transform(_, Text.From), "#(cr)#(lf)"), type text}),
    #"Renamed Columns" = Table.RenameColumns(#"Extracted Values",{{"List_Annotation", "annotation_concat"}}),
    #"Removed Columns1" = Table.RemoveColumns(#"Renamed Columns",{"Group_Annotation"}),
    #"Filtered Rows" = Table.SelectRows(#"Removed Columns1", each ([object_code] < > "dcterms:LicenseDocument"))
in
    #"Filtered Rows"

The Table.Group instruction retains annotation_property, object_type, and object_code, and consolidates annotation. The Text.Combine instruction concatenates the list strings, inserting a line feed.

Finally, Annotation Property 1470 is a reference metadata set comprising of annotation code, QName, Namespace, and skos_definition columns.

Figure 15:
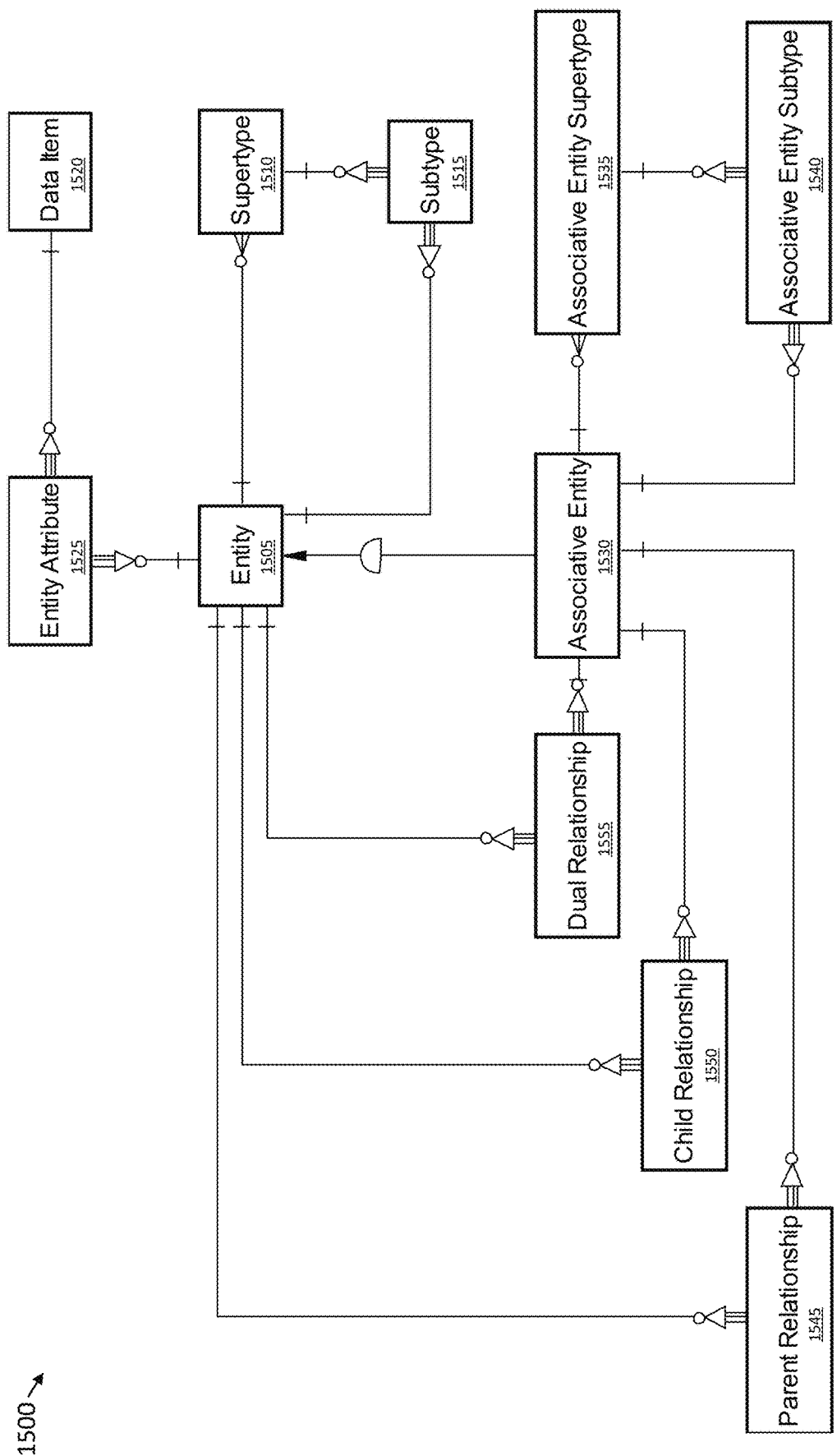
FIG. 15 is an LDM diagram of the Entity-Relationship Metadata Sets.

FIG. 15 is a logical data model of the Entity-Relationship Metadata Sets 1500. Just like the Ontology MDS diagram, this LDM is a blueprint for embodiments that implement on relational databases or use object-orientated programming languages. For the Excel implementation, the data dependencies, visualized in relationship lines, guide orchestration, the order of populations for the data sets. The design is similar to the Entity-Relationship metamodel but considers transformation processing. In other words, the E/R Metadata Sets are appropriately denormalized.

The Entity MDS 1505 sources from the Class Ontology MDS, as discussed in the source-to-target example.

The Supertype Metadata Set 1510 contains records for subtype symbols, as in FIG. 1 Depository Institution subtype symbol 150. Only data modeling tools like PowerDesigner or ERWin that support the subtype symbol require this metadata set. For other tools like Sparx EA, there is a different MDS directly linking supertype to subtype entities.

Table 9 lists the keys, column names, and sample record values:

TABLE 9

Supertype E/R Metadata Set

| Key | Name | Sample record |
|---|---|---|
| PK | Entity_Code | fibo-fbc-fct-fse:DepositoryInstitution |

TABLE 9-continued

Supertype E/R Metadata Set

| Key | Name | Sample record |
|---|---|---|
| AK1 | Subtype_Code | fibo-fbc-fct-fse:DepositoryInstitution_ST |
| AK2 | Subtype_Name | Depository Institution subtype |
|  | Comment | The subtype symbol for supertype Depository Institution |
|  | Is_Exclisive |  |

The key on Entity_Code means that there is one record in the metadata set for every entity that has subtypes. The subtype [symbol] code, name, and comment derive from the supertype entity, as per configurable string manipulation. The Supertype MDS populates from an intermediate MDS, tSupertype, which is an inner join of Ontology Superclass MDS and the Entity MDS. For all Entities that are Supertypes, the intermediate table populates with the Entity_Code, Entity_Name, Is_Exclisive indicator. Three additional columns Subtype_Code, Subtype_Name, and Comment, derive their values from entity code and name with formulas:
Subtype_Code=CONCAT([@[Entity_Code]], "_ST")
Subtype_Name=CONCAT([@[Entity_Name]], "subtype")
Comment=CONCAT("The subtype symbol for supertype", [@[Entity_Name]])
CONCAT is an Excel string function, and the Entity_Name is the example is "Depository Institution."

Embodiments with other implementations can use the formulas and M-language as pseudo-code.

The Subtype 1515 Metadata Set holds the subtypes for a particular entity. Table 10 shows the metadata set containing three columns:

TABLE 10

| | Subtype E/R Metadata Set | |
|---|---|---|
| Key | Name | Sample record |
| PK | Supertype_Entity_Code | fibo-fbc-fct-fse:DepositoryInstitution |

TABLE 10-continued

| | Subtype E/R Metadata Set | |
|---|---|---|
| Key | Name | Sample record |
| AK | Subtype_Code | fibo-fbc-fct-fse:DepositoryInstitution_ST |
| PK, AK | Subtype_Entity_Code | fibo-fbc-fct-fse:Bank |

The composed key means that a subtype can have more than one supertype, a default configuration options for Conceptual Data Models (CDM) derived from domain ontologies.

The Data Item 1520 metadata defines common attributes in data models.

Table 11 shows the Data Itemmetadata set columns:

TABLE 11

| | Data Item E/R Metadata Set | |
|---|---|---|
| Key | Name | Sample record |
| PK | Data_Item_Code | fibo-be-le-lei:hasOwnershipPercentage |
| | Name | Ownership Percentage |
| | Prefix | fibo-be-le-lei |
| | Localname | hasOwnershipPercentage |
| | Comment | The percentage ownership interest in the owned entity owned by owning entity, if known |
| | URI | https://spec.edmcouncil.org/fibo/ontology/BE/LegalEntities/LEIEntities/hasOwnershipPercentage |
| | Data_Type | Decimal |
| | Parent_Data_Item | fibo-be-le-lei:isQuantifiedBy |
| | Resource_Type | owl:DatatypeProperty |

The primary source for Data Item is the Data Property MDS, and the sample, "Ownership Percentage" is the same as in Table 4. The Transformation uses the same techniques to derive a logical data model Name from the ontology Localname, and to correct duplicate names, as describes for Entity and Supertype symbol. The configurable naming rules eliminate the "has" prefix.

The value in Data_Type is a lookup of a configurable mapping table from ontology XSD to data model standard types. M-language instructions merge the Data Property MDS and intermediate tables to create the Data Item data set.

The Entity Attribute 1525 metadata set associates Data Items 1520 to the Entity 1505.

The metadata set has three columns, Entity (code), Attribute (code), and the indicator Mandatory. Two ontology design patterns connect the class to a data property, data property domain, and class restrictions. Hence, the PowerQuery on Entity_Attribute combines two intermediate metadata sets, tEntityAttributeFromDomain, and tEntityAttributeFromRestriction, all three metadata set having the same columns:

```
Let
    Source = Table.Combine({tEntityAttributeFromDomain, tEntityAttributeFromRestriction}),
    #"Grouped Rows" = Table.Group(Source, {"Entity", "Attribute"}, {{"Count", each
List.Max([Mandatory]), type number}}),
    #"Sorted Rows" = Table.Sort(#"Grouped Rows",{{"Entity", Order.Ascending}}),
    #"Renamed Columns" = Table.RenameColumns(#"Sorted Rows",{{"Count", "Mandatory"}})
in
    #
"Renamed Columns"
```

The M-language instruction Table.Combine is similar to the SQL UNION. The Table.Group instruction removes duplicate Entity Data Item records, retaining the Mandatory value of 1. In other words, any mandatory data property restriction makes the attribute mandatory.

The Ontology Data_Property_Domain MDS is the data source for tEntityAttributeFromDomain MDS, and Ontology MDS Data Property Restriction is the source for tEntityAttributeFromRestriciton. The Mandatory indicator is 1 if a restriction specifies a minimum cardinality >0 or exact cardinality of 1.

As discussed for the Data Property Restriction MDS, the default configuration setting transforms all data properties into data model attributes on an entity. This setting reflects the design and intention of the FIBO and most other domain ontologies. Domain ontologies already encapsulate data properties in classes for various dates, amounts, names, and codes. Hence there are no intended multi-valued data properties in the source ontology. Users can change this setting, and developers can add metadata sets and transformation rules for wrapper entities.

The default configuration, recommended for domain ontologies, transforms object properties into associative entities. The Associative Entity 1530 is a specialization of Entity 1505. Table 12 lists the column using the same sample, "identifies," of the ontology MDS.

TABLE 12

Associative Entity E/R Metadata Set

| Key | Name | Sample record |
|---|---|---|
| PK | Code | lcc-lr:identifies |
| AK1 | Name | identifies |
|  | Comment | Recognizes or establishes within some context |
| AK2 | URI | https://www.omg.org/spec/LCC/Languages/LanguageRepresentation/identifies |
|  | functional | FALSE |
|  | inverse_functional | FALSE |
|  | Prefix | lcc-lr |
|  | Localname | identifies |
|  | Restriction |  |
|  | Equivalent | owl:inverseOf lcc-lr:isIdentifiedBy |

Code, Name, Comment, URI, functional, inverse_functional, Prefix, Localname, and Restriction transform from the ontology and intermediate metadata sets, using the same techniques described for Entity and Data Property.

The challenge is in the value of the Equivalent column: owl:inverseOf lcc-lr:isIdentifiedBy The Ontology MDS section of this specification stipulated that Inverse Object Properties must merge. (see, J. Ziemer "Ontology ObjectProperties are Data Model Associative Entities—not Relationships." pp 16, 17). We must not have two relationships in the opposite direction, swapping parent and child entity, between entities. In the example transformation of FIG. 1, a Bank Account Identifier identifies 180 a Bank Account. The ontology may also state a Bank Account isIdentifiedBy a Bank Account Identifier, but the data model does not allow this pattern. Following data model naming standards, CODT eliminates the passive relation, "isIdentifiedBy," and adds an inverse of the metadata to the retained active relation. The user may override the CODT determination and must configure the setting, where the Transformation cannot determine the active relation. The outcome is Table 13, a master list of object properties that transform into associative entities:

TABLE 13 sActivePassive Metadata Set

| Key | Name | Sample record 1 | Sample record 2 | Sample record 3 |
|---|---|---|---|---|
| PK | Active | fibo-be-fct-pub:publishes | fibo-be-ge-ge:hasJurisdiction | fibo-be-le-fbo:hasSubUnit |
|  | Passive | fibo-be-fct-pub:hasPublisher | fibo-be-ge-ge:isJurisdictionOf | fibo-be-le-fbo:isSubUnitOf |

The master list, sActivePassive, is a filter for Associative Entity.

Associative Entity Supertype 1535 and Associative Entity Subtype 1540 follow the structure of Entity supertype and subtype. The transformation technique is also similar but has one addition: The passive data property may yield additional subtypes or supertypes. For example, sample record 3, isSubUnitOf maybe sub-property of isPartOf, which is the passive or hasPart. The Transformation harvests this metadata and applies it to the active associative entity, making fibo-be-le-fbo:hasSubUnit subtype of hasPart.

In the Entity-Relationship MDS, relationships connect base entities derived from ontology classes to associative entities derived from ontology object properties. Data model relationships are directional from a "Parent" to a "Child" entity, with Parent-entity primary key attributes migrating to the Child-entity. In an ontology, the domain of the object property indicates the parent, and the range indicates the child. Likewise. A class with an owl:onroperty restriction is the parent, optionally the restriction may specify the child. For inverse object properties merged into the active associative entity parent and child are reversed. In the first sample record, the domain of isJusristictionOf becomes range for hasJurisdiction.

The Parent Relationship 1545 MDS contains the data model metadata linking a parent base entity to the associative entity, for example, Bank Account Identifier to Band Account.

Table 14 shows the structure and a sample record.

TABLE 14

Parent Relationship E/R Metadata Set

| Key | Name | Sample record |
|---|---|---|
| PK | Parent_Entity_Code | fibo-fbc-fct-rga:RegulatoryAgency |
| PK | Associative_Entity_Code | fibo-be-ge-ge:hasJurisdiction |
| AK | RLtnp_Parent_Code | fibo-fbc-fct-rga:RegulatoryAgency_fibo-be-ge-ge:hasJurisdiction |
| | Rltnp_Parent_Name | Regulatory Agency - has Jurisdiction |
| | Parent_Entity_Name | Regulatory Agency |
| | Associative_Entity.Name | has Jurisdiction |
| | Rltnp_Parent_Comment | Links the base entity 'Regulatory Agency' to the associative entity 'has Jurisdiction.' |
| | Is_Identifying | N |
| | Min_Cardinality | 1 |
| | Max_Cardinality | 999 |

Parent_Entity_Code and Associative_Entity_Code, referring to Entity and Associative Entity MDS, constitute the primary key. Parent_Entity_Name and Associative_Entity_Name source from their reference MDS, Entity, and Associative_Entity. Rltnp_Parent_Code, Rltnp_Parent_Name, and Rltnp_Parent_Comment derive from Rltnp_Parent_Name and Associative_Entity_Name. The Is_Identifying indicator, Min and Max_Cardinality, derive from cardinalities in the class restrictions.

The Child Relationship 1550 and Dual Relationship 1555 have the same structure as the Parent Relationship 1545. All three MDS have a logical only supertype, Relationship, not depicted in the diagram and not a physical MDS. In other words, relationship records in the three MDS are distinct.

The complexity of populating the Relationship MDS arises from different ontology metadata patterns, domain/range and class restrictions, and harvesting relationship metadata from merger passive inverse object properties.

Figure 16:
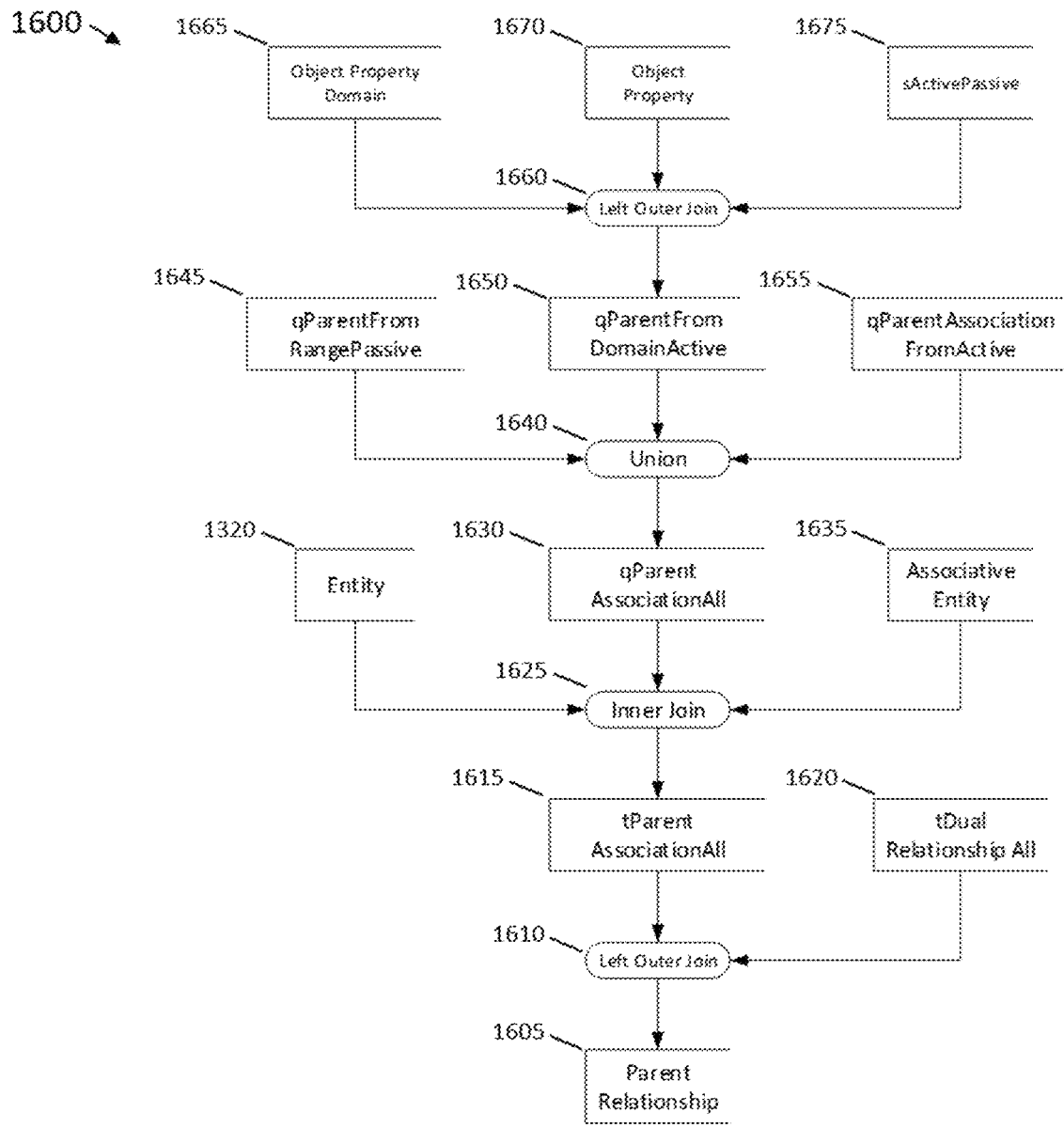
FIG. 16 is a Data Flow Diagram of the Parent Relationship metadata set population.

FIG. 16 is a data flow diagram 1600 tracing the Transformation of Parent Relationship 1605 via various intermediate MDS to source ontology MDS.

The population process is a Left Outer Join 1610 of tParentAssotiationAll 1615 all and tDualRelationship 1620. A dual relationship indicates that the entity is a parent in some relationship and child in others.

For example, a director may appoint a manager who, in turn, appoints team members. The query filters out relationships that are already in the Dual Relationship set.

The intermediate MDS tParentAssotiationAll 1615 populates with an Inner Join 1625 of qParentAssociationAll 1630 with reference data from Entity 1320 and Associative Entity 1635. For all records in qParentAssociationAll 1630, the M-language query looks up the entity and associative entity name. The prefix "q" indicates a simple query without added columns and formulas, whereas the prefix "t" stands for the table. The intermediate table metadata set tParentAssociation all add columns for Rltnp_Parent_Code, Rltnp_Parent_Name, and Rltnp_Parent_Comment, and derives their values from the logical names via string CONCAT formulas.

The metadata set populates as a distinct Union 1640 of intermediate MDS with records harvested range, domain, and class restriction. qParentFomDomainActive 1650 lists parent, restriction, associations, min, and max cardinality from active association (object properties) and their domain. The metadata set populates from a Left Outer Join 1660 of Ontology MDS Object Property Domain 1665 and Object Property 1670, with the already described aActivePassive 1675 MDS. The query filters out passive object properties that must not transform into associations. The qParentFromRangePassive intermediate MDS populates with a similar join on Object Property, Object Property Range, and sActivePassive. Finally, qParentAssotiationFromActive populates from a join of Object Property and Object Property Restriction with sActivePassive.

Following the disclosed techniques and design patterns, developers can implement metadata sets and queries for Child and Dual Relationships.

Packages organize entities in a data model. Table 15 shows the Packages metadata set.

TABLE 15

Packages E/R Metadata Set

| Key | Name | Sample record |
|---|---|---|
| PK | Package_Code | fibo-be-ge-usj |
| AK | Package_Name | US Government Entities And Jurisdictions |
| | Package_Comment | The package for data model objects derived from the US Government Entities And Jurisdictions ontology module. This ontology provides the set of basic federal government, state, and territory level entities and jurisdictions for use in other US-specific FIBO ontologies. |
| | URI | https://spec.edmcouncil.org/fibo/ontology/BE/GovernmentEntities/Nort hAmericanJurisdiction/USGovernmentEntitiesAndJurisdictions/ |
| | Parent_Code | fibo-be-ge |

The metadata set has the Ontology (module) MDS as the data source. Large ontology schemas like the FIBO may have over a hundred Ontology modules or files. The user and developer can decide on a suitable package hierarchy, as far as the data modeling tool supports it.

CODT transforms ontology annotation properties into data model documentation. Table 16 shows a subset of the Entity_Documentation MDS.

TABLE 16

Entity Documentation Metadata Set

| Key | Name | Sample record |
|---|---|---|
| PK | Entity_Code<br>fibo-fnd-utl-av:explanatoryNote | fibo-fnd-law-cor:Law<br>Law is a term which does not have a universally accepted definition. Certain laws are made by governments, specifically by their legislatures |

```
Let
    Source = qAnnotationConcat,
    #"Filtered Rows" = Table.SelectRows(Source, each ([object_type] = "owl:Class")),
    #"Merged Queries" = Table.NestedJoin(#"Filtered Rows", {"annotation_property", "object_type"},
qAnnotationCount, {"annotation_property", "object_type"}, "qAnnotationCount", JoinKind.FullOuter),
    #"Expanded qAnnotationCount" = Table.ExpandTableColumn(#"Merged Queries",
"qAnnotationCount", {"annotation_property", "In_Class_Scope"},
{"qAnnotationCount.annotation_property", "qAnnotationCount.In_Class_Scope"}),
    #"Filtered Rows2" = Table.SelectRows(#"Expanded qAnnotationCount", each
([qAnnotationCount.In_Class_Scope] = "Y")),
    #"Removed Other Columns" = Table.SelectColumns(#"Filtered Rows2",{"object_code",
"annotation_property", "annotation_concat"}),
    #"Merged Queries1" = Table.NestedJoin(#"Removed Other Columns", {"object_code"}, Entity,
{"Code"}, "Entity", JoinKind.LeftOuter),
    #"Expanded Entity" = Table.ExpandTableColumn(#"Merged Queries1", "Entity", {"Code", "Name"},
{"Entity.Code", "Entity.Name"}),
    #"Filtered Rows1" = Table.SelectRows(#"Expanded Entity", each ([Entity.Code] < > null)),
    #"Removed Columns" = Table.RemoveColumns(#"Filtered Rows1",{"Entity.Code", "Entity.Name"}),
    #"Pivoted Column" = Table.Pivot(#"Removed Columns", List.Distinct(#"Removed
Columns"[annotation_property]), "annotation_property", "annotation_concat"),
    #"Replaced Value" = Table.ReplaceValue(#"Pivoted
Column",null,Replacer.ReplaceValue,{"rdfs:comment", "rdfs:isDefinedBy", "rdfs:label",
"skos:definition", "fibo-fnd-utl-av:definitionOrigin", "skos:editorialNote", "fibo-fnd-utl-av:synonym",
"fibo-fnd-utl-av:explanatoryNote", "skos:scopeNote", "fibo-fnd-utl-av:adaptedFrom", "skos:example",
"rdfs:seeAlso", "fibo-fnd-utl-av:abbreviation", "fibo-fnd-utl-av:usageNote", "skos:altLabel", "skos:note",
"fibo-fnd-utl-alx:actualExpression"}),
    #"Renamed Columns" = Table.RenameColumns(#"Replaced Value",{{"object_code", "Entity_Code"}}),
    #"Sorted Rows" = Table.Sort(#"Renamed Columns",{{"Entity_Code", Order.Ascending}})
in
    #"Sorted Rows"
```

TABLE 16-continued

Entity Documentation Metadata Set

| Key | Name | Sample record |
|---|---|---|
|  |  | although the sense intended here is broader. The formation of laws themselves may be influenced by a constitution (written or unwritten) and the rights encoded therein. The law shapes politics, economics and society in countless ways and serves as a social mediator of relations between people. |
|  | fibo-fnd-utl-av:definitionOrigin | http://en.wikipedia.org/wiki/Law |
|  | rdfs:isDefinedBy | fibo-fnd-law-cor: |
|  | rdfs:label | law |
|  | skos:definition | a system of rules and guidelines which are enforced through social institutions to govern behavior |
|  | skos:editorialNote | Any law or body of law, which may have force in some context, including national laws, company bylaws and the like. |

Ontologists may use a wide variety of annotation properties. FIBO Classes, for example, have 24 different annotation properties, some occur only once. The data modeler may set up Documentation properties as Extended Attributes, User Defined Properties, or Tagged Values, depending on the particular data modeling tool, before importing. Analytical queries and metadata sets assist the user by providing a list of annotation properties, and a count of occurrences for ontology module, class data, and object property. The user can flag individual annotation properties or provide a minimum count to include them in the Transformation.

Below is an abridged version of the M-language query to populate the Entity Documentation MDS.

The query merges the Ontology Annotation MDS with the configuration table and filters rows in scope (flagged qAnnotationCount.In_Class_Scope="Y"). The ontology MDS has annotation properties as rows, but the subsequent import into the data modeling tool needs them as columns. The Table.Pivot instruction accomplishes the transposition.

Annotation concludes the description of Entity-Relationship metadata sets and their Transformation from ontology MDS. Developers can use the disclosed MDS structures, and M_language code to program other embodiments and ontology design patterns.

The next section describes the data modeling tool-specific modeling tool-specific metadata sets, taking PowerDesigner as an example.

Figure 17:
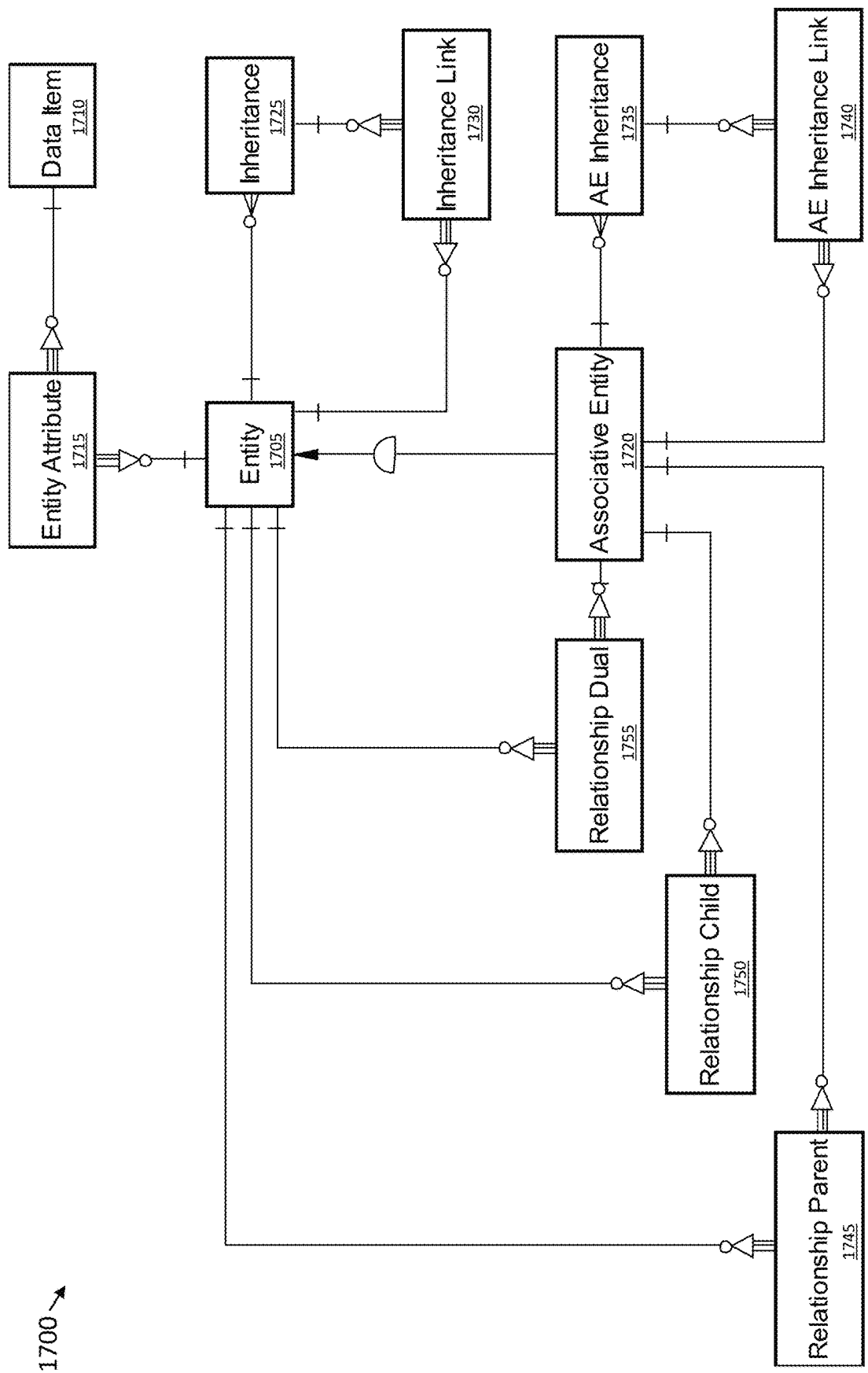
FIG. 17 is an LDM diagram of the PowerDesigner Metadata Sets.

FIG. 17 is a logical model diagram of the PowerDesigner MDS 1700.

The PD Entity 1705 MDS is identical to the E/R MDS, and the population is a direct copy of records. The Data Item 1710 is also identical and a direct transformation of the E/R MDS. The only Transformation is to change the generic Data_Type "Variable characters" to PowerDesigner "Variable Characters (255).

The Entity Attribute 1715 has the same structure as its E/R counterpart. The only Transformation is to replace values in the Mandatory indicator from "0/1" to "Y/N." Note that the PowerDesigner Conceptual Data Model is one of the few models and tools to support Data Item as a model object. For other models and tools, Entity Attribute 1715 populates from a join of E/R MDS Data Item and Entity Attribute.

The PD Associative Entity 1720 MDS adds a column Stereotype with a constant value "Associative Entity" to the E/R Associate Entity MDS.

The Inheritance 1725 populates directly from the Supertype MDS. Minimal transformation rename columns to match PowerDesigner object names and replace Mutually_Exclusive values "true" with "Y." The Inheritance Link 1730 populates directly from the SubType MDS. The Transformation removes the Supertype_Entity_Code column and renames columns to fit the PowerDesigner object names. Note that some data modeling tools like Sparx EA do not support a supertype symbol. The Sparx Generalization is a direct relationship between two entities. A Generalization MDS populates from a join of Supertype and Subtype MDS.

Associative Entity (AE) Inheritance 1735 and AE Inheritance Link 1740 have the same structure as the base entity inheritance MDS and populate directly from their E/R counterparts.

Relationship Parent 1745, Relationship Child 1750, and Relationship Dual 1755 are direct copies of their E/R counterparts.

Packages, not depicted, is a direct copy of the E/R metadata set with two added columns, Resource_Name defaulting to Package Code and Resource_Type defaulting to "owl:Ontology." The columns provide a lineage to the ontology values if data modelers change the package code.

Annotation metadata sets, not depicted, are direct copies of their E/R counterparts.

PowerDesigner can directly import the MS-Excel metadata sets. The granular structure, with several imports into the same PowerDesigner data model object, facilitates diagnostics, but Developer and Data Architect may choose to consolidate import spreadsheets.

Figure 18:
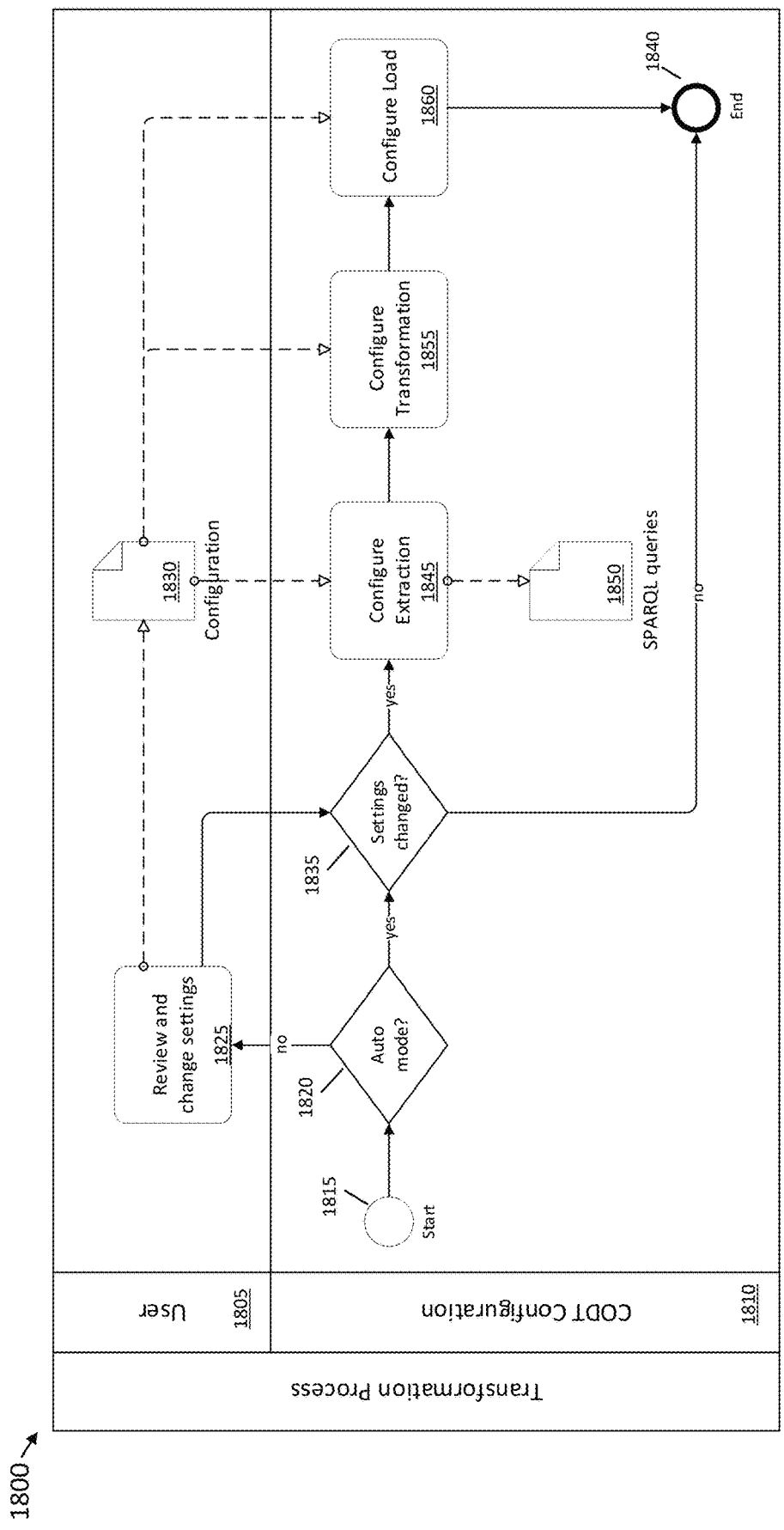
FIG. 18 is a BPMN diagram of the Configuration subprocess.

The next section describes the CODT method in detail. FIG. 18 shows Configuration 1800 task.

The diagram expands Configuration subprocess 425 of the FIG. 4 method overview.

Configuration in this specification means both, a user changing settings, User swimlane 1805 and the system, swimlane CODT Configuration 1810 of metadata sets based on the user settings.

The Start Event 1815 occurs when the parent process invokes Configuration, typically when the CODT application launches. The gateway 1820 branches depending on the CODT execution mode. Automatic mode means to run a transformation without launching the user interface. In the default, non-automatic mode, the user can review and change configuration settings 1825 and save a new configuration 1830 on the non-transitory storage medium.

The settings gateway 1835 checks if the Configuration has a timestamp newer than the last applied settings. If not, then the subprocess terminates in the End Event 1840.

Transformation settings may impact the Metadata Sets, their population, or column transformations. For MS-Excel embodiments, the best way of implementation is to configure, in other words, to overwrite workbook sheets, M-language queries, and formulas. Other embodiments, residing on an ETL platform or using object languages, may examine configuration parameters at runtime.

If the Configuration is new, then CODT Configures the Extraction 1845. A change parameter may specify a different file-folder for ontology metadata or different connection to an RDF-Store. Some configuration settings may require to modify SPARQL Queries 1850. For example, the user may configure to exclude particular ontology modules.

Process control then flows to Configure Transformation task 1855 The object property transformation is an example of a configuration setting that impacts metadata sets. The user may configure settings to transform object properties into relationships, associations, or the default, associative entities, each requiring different metadata sets. In Excel embodiments, the task copies the required sheet from templates into the Entity-Relationship MDS workbook. The task may modify and replace the M-language query if the configuration setting requires it. Finally, the task overwrites formulas as needed. The user, for example, may specify different naming standards to convert ontology class names into entity names. In MS-Excel, examining configuration parameters at runtime leads to overly complicated formulas and query code.

Finally, Configure Load 1860 overwrites the Tool-Specific MDS if the target Data Modeling tool has changed. Other configuration parameters may specify different connection parameters for the tool or a different target model. The task terminates in the End Event 1840 and with it Configure Transformation 1800 subprocess.

Figure 19:
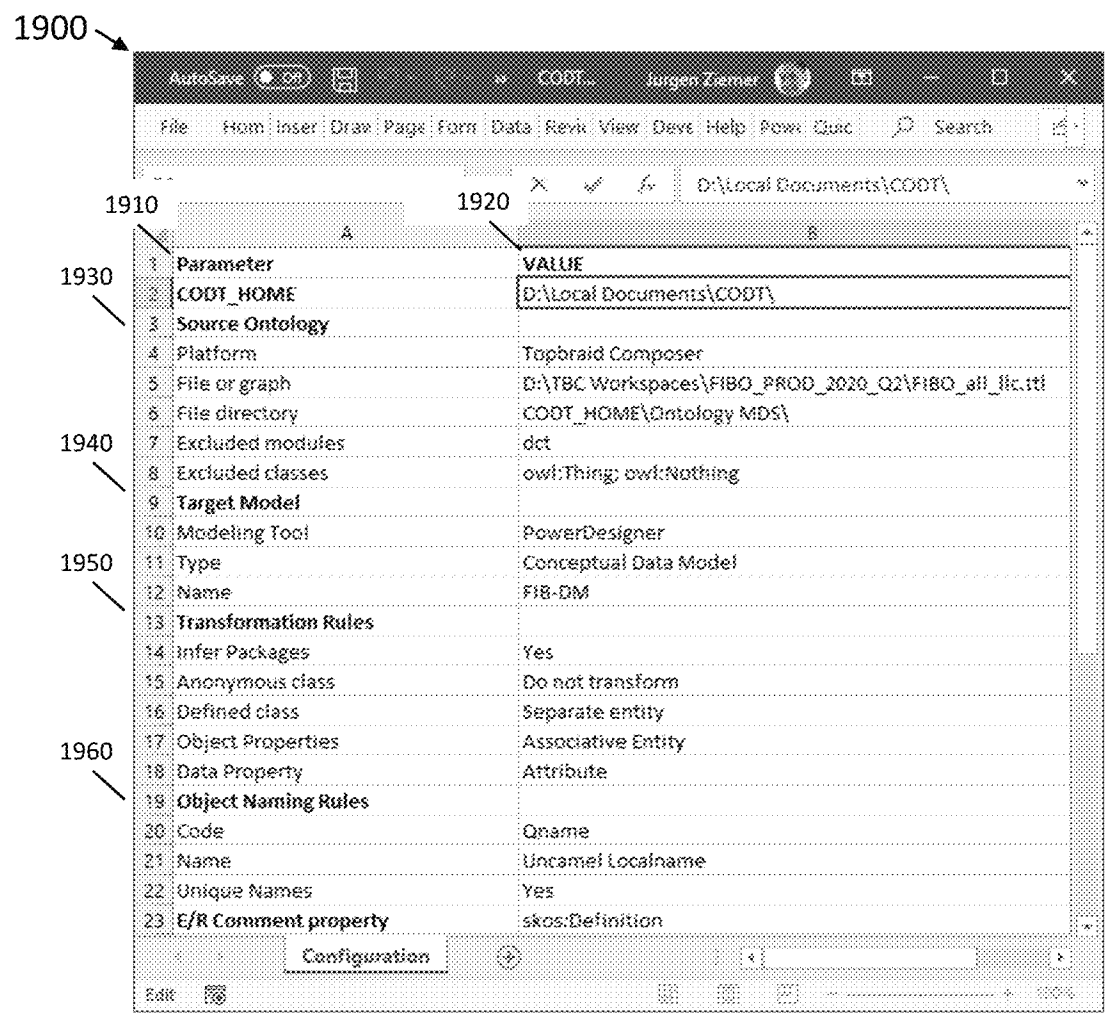

FIG. 19 is a CODT screenshot with the sheet for Configuration 1900. In the working product, the Configuration is a simple table with Parameter 1910 and Value 1920 columns. A power-user directly enters parameter values; developers may add parameters as needed. Section for Source Ontology 1930 and Target Model 1940 set file directories or connection strings to the external platforms.

Transformation Rules 1950 specify the scope of elements of the ontology and their designated data model object. The user can specify Object Naming Rules 1960 to support naming standards.

Figure 20:
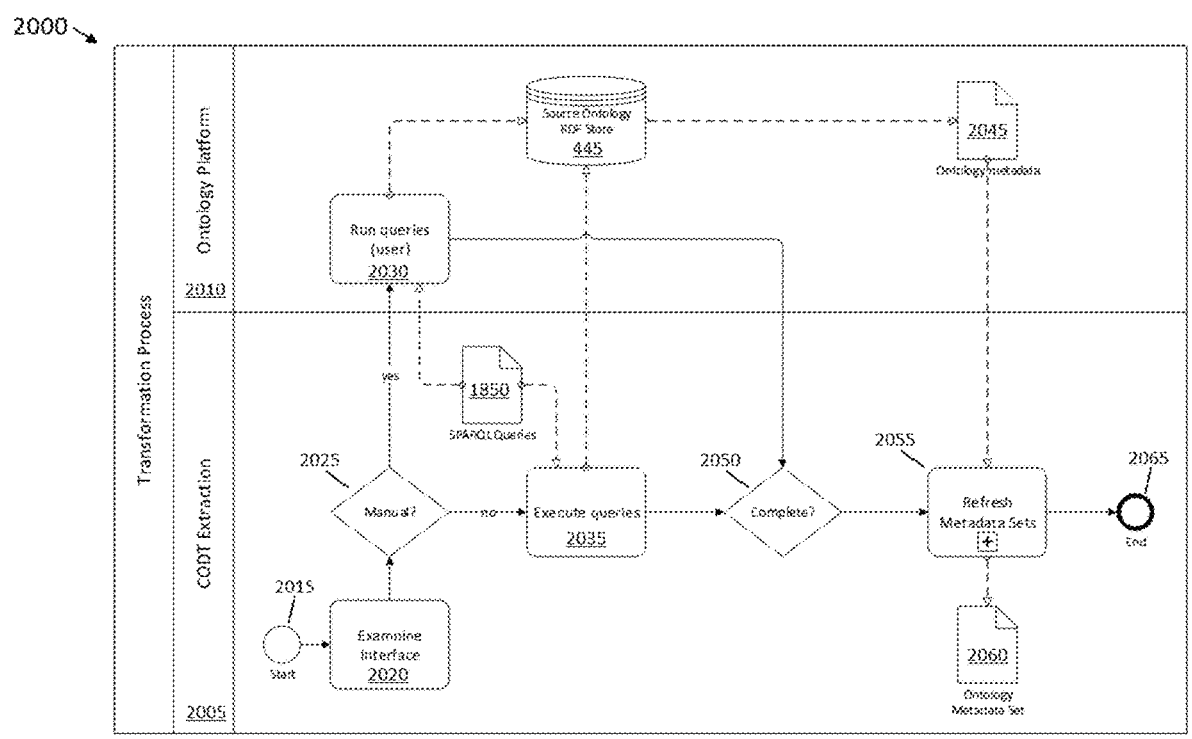
FIG. 20 is a BPMN diagram of the Extract Ontology Metadata subprocess.

FIG. 20 is a BPMN diagram expanding the Extract Ontology Metadata 2000 subprocess. The Extraction Component 225 of FIG. 2 is the part of the system implementing the subprocess, and the description non-transitory storage medium, Ontology Metadata Set 330 of FIG. 3 describes the data structure and its population code in detail.

Two swimlanes, CODT Extraction 2005 and Ontology Platform 2010, represent internal and external tasks, stores, and data objects.

The Start Event 2015 invokes the process and starts the Examine Interface 2020. The task reviews the Source Ontology configuration setting and validates the parameters.

The Manual 2025 gateway branches to manual user Run queries 2030 or automated CODT Execute queries 2035. Both tasks query ontology metadata with SPARQL Queries 1850 of the previous Configuration subprocess on the Source Ontology 445, and produce the output object from the source ontology datastore is the raw Ontology metadata 2045.

The Complete 2050 gateway merges the flows and invokes the Refresh Metadata Sets 2055 subprocess. The refresh subprocess updates all Ontology Metadata Sets, producing updated Ontology Metadata Sets 2060 and terminates Extract Ontology Metadata with the End Event 2065.

Figure 21:
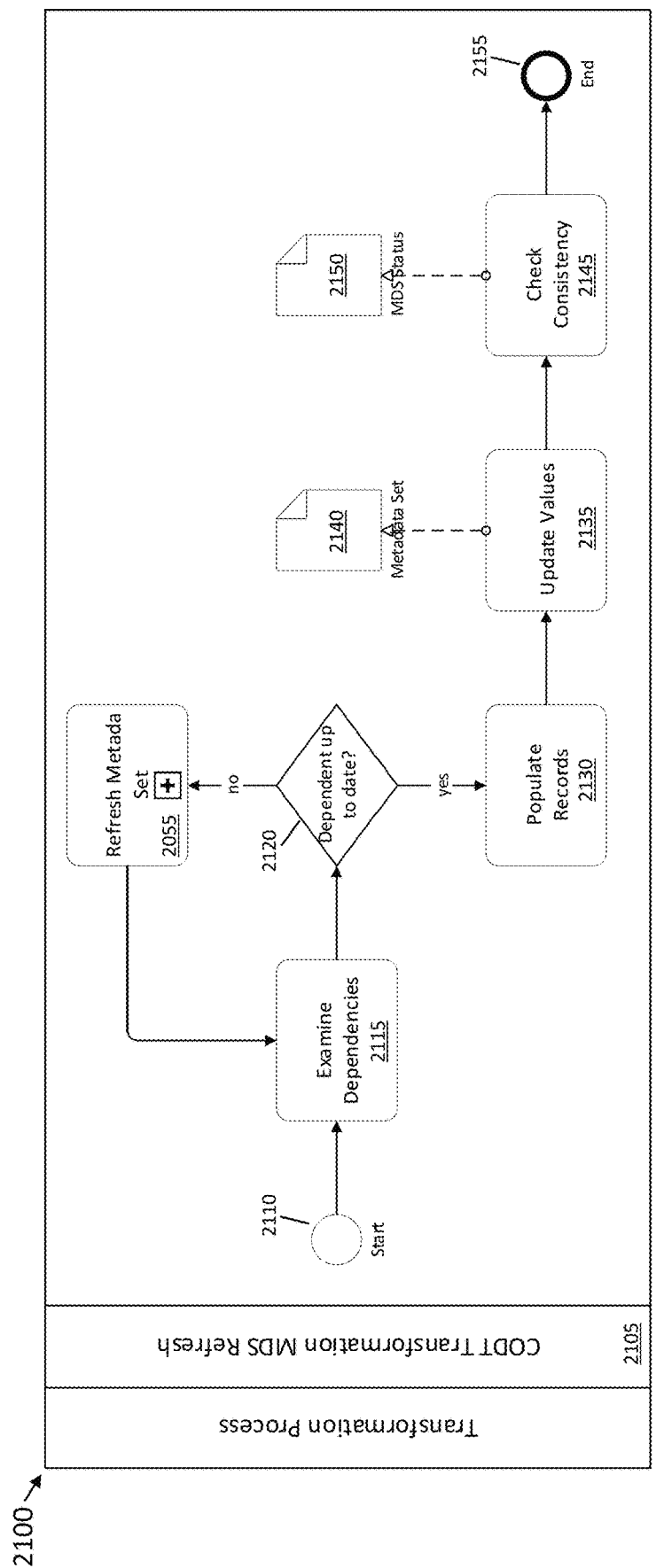
FIG. 21 is a BPMN diagram of the Refresh Metadata Set subprocess.

FIG. 21 is a BPMN diagram of the Refresh Metadata Sets subprocess 2100, which is internal and has only one swimlane 2105. All components, Extract, Transform, and Load call this subprocess to update an Ontology, Entity-Relationship, or Tool-Specific Metadata Set, triggering the Start Event 2110 for a particular set. In MS-Excel embodiments PowerQuery automatically refreshes individual or all queries, taking care of dependencies, as depicted in FIG. 7

Refresh All 720. For other embodiments, the subprocess shows how to encode the recursion of dependent metadata set, as in FIG. 13 populating the Entity MDS 1320 and its dependent intermediate metadata sets.

The Start Event 2110 invokes Examine Dependencies 2115, listing all MDS referenced in the query, as well as their status. If gateway 2120 finds the dependent MDS not up to date, the gateway calls itself; Refresh Metadata Sets 2055 subprocess for that particular metadata set. For example, refreshing the E/R Entity MDS 1335 of FIG. 13, the refresh subprocess may refresh qEquivalent MDS 1350.

Once all dependent MDS are up to date, the gateway starts Populate Records 2130, executing the M-language query for Excel embodiments, followed by Update Values 2135 to compute dependent columns. The output object of the two tasks is the up to date Metadata Set 2140. Finally, the Check Consistency 2145 task validates the metadata set and records an MDS Status 2150 before terminating in the End Event 2155.

Figure 22:
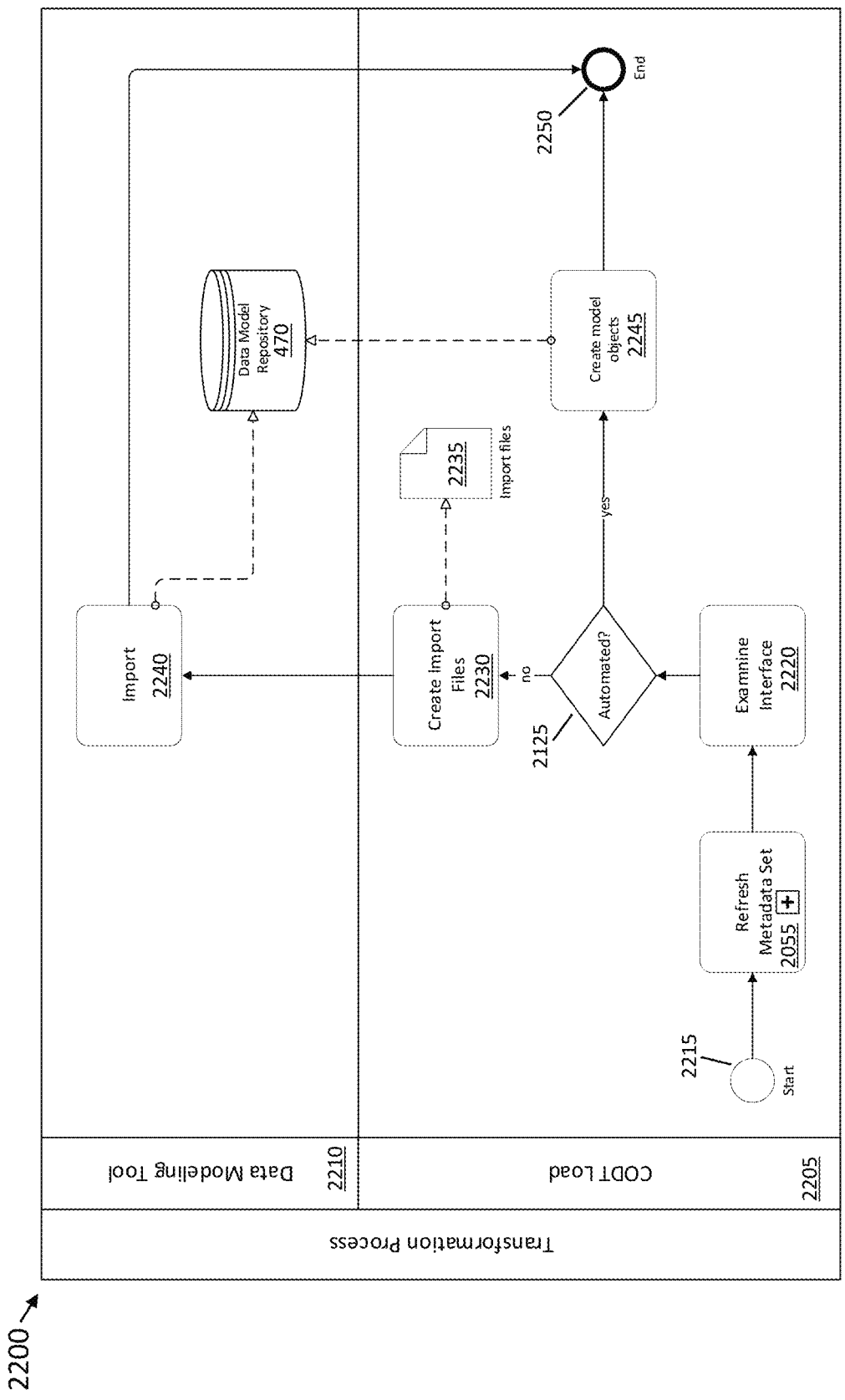
FIG. 22 is a BPMN diagram of the Load subprocess.

FIG. 22 shows the Load 2200 subprocess with its two swimlanes for CODT 2205 and the external Data Modeling Tool 2210. The Start Event 2215 passes the control flow to the Refresh Metadata Sets 2055 subprocess for the Tool-Specific Metadata Sets. Examine Interface 2220 checks configuration settings to determine whether the load mode is manual or automated. For not automated, manual mode, the gateway 2125 invokes Create Import Files 2230. For PowerDesigner, the Import Files 2235 is the Ontology MDS; for other tools, the task creates CSV files.

The Import 2240 task is external to CODT; within the data modeling tool, a user manually imports the Ontology MDS or CSV files, and stores the data model on a non-transitory storage medium, as a file or in a repository 470.

For the automated mode, gateway 2125 invokes the Create model objects 2245 task, which connects to the Data Model Repository 470 (or tool), loading Tool-Specific Metadata Sets, creating model objects directly. Both tasks the manual user Import 2235 and the automated Create Model objects 2245 task exit with the End Event 2250.

The previous sections described the ontology to data model transformation as a system, storage medium, and method. Table 18 aligns the system components, with their metadata sets, and subprocesses.

TABLE 18

Alignment

| System Component Component | Storage Medium Metadata Set | Method Subprocess |
|---|---|---|
| Extraction | Ontology | Extract Ontology metadata |
| Transformation Load | Entity-Relationship Data Modeling Tool-specific | Transform Metadata Load into Modeling Tool |

First, the Extraction Component uses Ontology metadata sets to extract source ontology metadata.

Second, the Transformation component uses E/R metadata sets to transform the metadata.

Third, the Load component uses tool-specific metadata sets to load data model metadata into the modeling tool.

Table 19 lists different ways to implement CODT, broken down by categories Ontology Source, Transformation System, and target Data Model, each category having three sub-categories.

TABLE 19

Implementation Embodiments

| Ontology Source | | | Transformation System | | Data Model | | |
|---|---|---|---|---|---|---|---|
| Type | Subtype | Extraction | OS | Application type | User Interface | Data Model Type | Modeling Tool | Tool Interface |
| Ontology platform | Development Platform RDF Store, Semantic Endpoint | SPARQL | MS Windows | MS-Excel | White Box | Conceptual Logical | Power Designer Sparx EA | Import |
| RDF/OWL files | Local World Wide Web | Parser | Unix | ETL Program | Guided | Physical Object | Other | API |

The values of the sub-categories define a possible embodiment. For example, the First Embodiment, the MS-Excel working product, has an Ontology Platform as its source and uses SPARQL. The platform may be a development platform (a.k.a. an ontology editor) or an RDF Store with a Semantic Endpoint.

SPARQL is the recommended method to extract ontology metadata. However, if an Ontology Platform is not available, a Parser embodiment may extract ontology metadata parsing ontology files locally or from the World Wide Web using their Namespace URI, populating the Ontology MDS with the parsed ontology structure.

The first embodiment resides on MS-Windows using MS-Excel. Other embodiments may be server-side on UNIX using an ETL environment or a standalone program. CODT Implementations as an object-orientated language program, (e.g., Java, C++) should have classes for the metadata sets, with attributes for the MDS columns, and a population method to create objects of the class. For non-Excel implementations, the MDS would best be database tables. ETL implementations may provide 4GL languages for a set-based transformation, similar to the MS-PowerQuery M-language. The working product is a white box—a user is free to inspect metadata sets, edit and review metadata. A guided user interface in MS-Excel protects the workbook sheets. It enables scoping of source ontology elements and controlled editing of values. For the Configuration Component, this may comprise forms and controls to enter settings and parameters. The working product creates import files for PowerDesigner and Sparx EA data modeling tools, and a user may use the data modeling tool importing the files.

The target Data Model in the working product is a Conceptual Data Model for PowerDesigner and a Logical Data Model for Sparx EA, using the external data modeling tool to import model metadata. Other model types comprise of physical data models or object-orientated class models.

Some data modeling tools do not support metadata import from files. However, most have an Application Programming Interface (API). The working product creates import files for PowerDesigner and Sparx EA data modeling tools, and a user may use the data modeling tool importing the files. In an automated mode, CODT connects to the data modeling tool or metadata repository, directly creating data model objects.

The Reverse Mode is a specific embodiment, enabling a user to transform a data model into an ontology. The use case for ontologies reverse-engineered from data models is twofold: First, to enhance an enterprise ontology with content from an enterprise or subject area data model, and second, to create an ontological representation of an operational system for knowledge graphs.

By design, the metadata sets are by-directional. That means the MDS columns for Ontology and Data Modeling Tool are the same, regardless of whether a Load or Extraction component utilizes the MDS. The columns of the generic Entity-Relationship MDS do not change if the set populates from a Tool-Specific MDS instead of the Ontology MDS. Only the population queries and formulas must change to enable a reverse direction.

Considering the System Component Diagram, FIG. 2, the external components, Ontology Platform 205, and Data Modeling Tool 210 switch places. The Extraction component 225 accesses the Data Modeling Tool's Import Interface 220, and the Load component accesses the SPARQL Interface 215.

Figure 23:
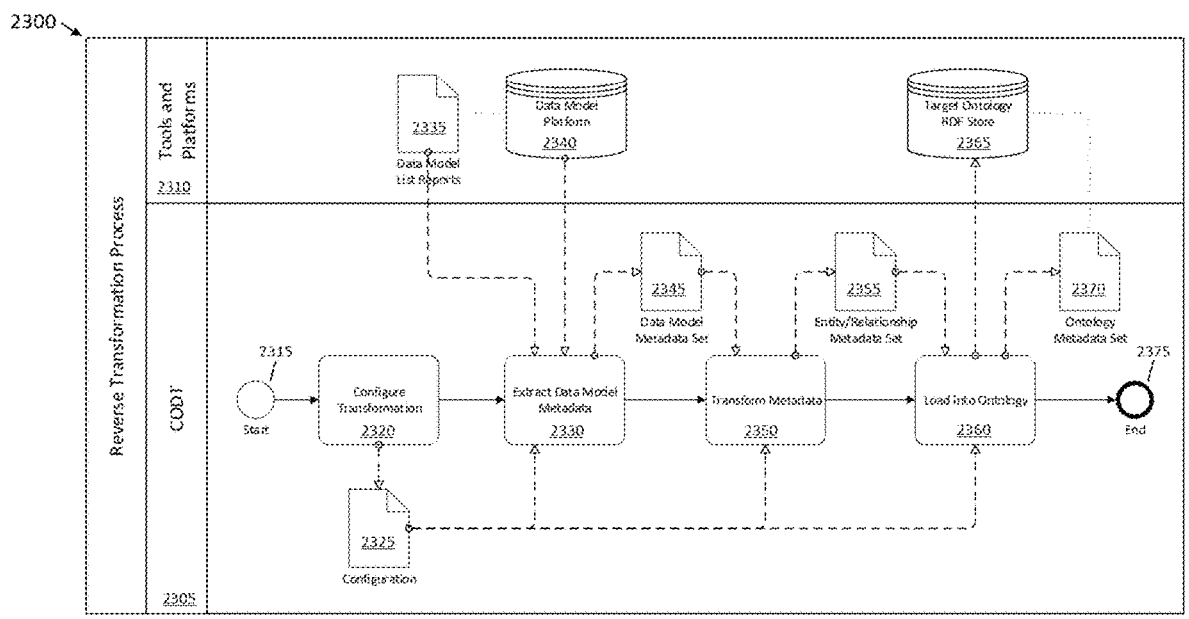
FIG. 23 is a BPMN diagram of the Reverse Transformation process.

FIG. 23 is a BPMN diagram of the Reverse Transformation Process 2300, which has two swimlanes, CODT 2305, and external Tools and Platforms 2310. The Start Event invokes Configure Transformation 2320, which has the same environment, data model, and ontology platform parameters, but different transformation and naming rules. As a default, entities transform into classes, data items into data properties, extended attributes into annotation properties. A user may configure settings to transform attributes into class restrictions, the default preserving cardinalities or domains. The user must specify object naming rules transforming code and name into ontology Prefix and Localname. The default for names is a Camel Code string function, removing spaces from the logical data model name. The user can save the Configuration 2325 and Extract Data Model Metadata 2330 invokes. A premise of the reverse mode is that data modeling tools can export metadata in the Tool-Specific MDS format. Indeed, all data modeling tools have list report functionality to generate custom Data Model List Reports 2335 in MS-Excel or CSV. For Data a Model Platform 2340, CODT can use the API or query the underlying database. The output object of the task is the Data Model Metadata Set 2345.

Transform Metadata 2350 in reverse mode performs minimal transformations on the extracted data model metadata, like changing the Inheritance MDS 1725 of FIG. 17 into Supertype MDS 1510 of FIG. 15 for PowerDesigner. The task saves the Entity-Relationship MDS 2355, which is the input data object for the subsequent Load Into Ontology 2360 task. The description of Configure Transformation 2320 options already listed the default transformations. Notably, the target ontology must define the Prefix, making the Namespace of Table 2 and others redundant. The task creates the Ontology Metadata Set 2370 and generates SPARQL CONSTRUCT statements from the Ontology MDS. In manual mode, the user can execute the CONSTRUCTs to create elements of the ontology or use platform functionality for bulk inserts. In automated mode, CODT connects a Target Ontology RDF Store 2365 or SPARQL endpoint and assets the triples.

The sample SPARQL code below creates three classes.

```
CONSTRUCT {
fibo-be-corp-corp:BoardAgreement rdf:type owl:Class.
fibo-be-corp-corp:JointStockCompany rdf:type owl:Class .
fibo-be-corp-corp:PrivatelyHeldCompany rdf:type owl:Class.
}
WHERE { }
```

Whereas the SPARQL SELECT statements join triples to return a result set in relational form, the Reverse Mode Load breaks down the relational record into triples.

This section concludes the detailed specification of the Configurable Ontology to Data Model Transformation.

I claim:

1. A system, comprising:
a non-transitory storage medium that stores computer-executable components and a processor that executes the computer-executable components stored on the non-transitory storage medium, wherein the computer-executable components comprise:
a configuration component that enables a user to configure settings for a transformation of elements of an ontology into elements of a data model;
an extraction component that retrieves ontology metadata and converts ontology metadata into ontology metadata sets;
a transformation component that transforms the ontology metadata sets into entity-relationship metadata sets and the entity-relationship metadata sets into modeling tool-specific metadata sets; and
whereby said system transforms ontology metadata into modeling tool-specific metadata according to configuration settings.

2. The system of claim 1, wherein the extraction component can retrieve the ontology metadata from an ontology platform executing SPARQL metadata queries.

3. The system of claim 1, wherein the extraction component can retrieve ontology metadata by parsing ontology files.

4. The system of claim 1, further comprising:
a load component that can connect to a modeling tool and populate a data model with data model elements from the modeling tool-specific metadata set.

5. A non-transitory storage medium storing ontology metadata sets, entity-relationship metadata sets, and data modeling tool-specific metadata sets coupled with machine-readable instructions that cause one or more processors to:
enable a user to configure settings for a transformation of elements of an ontology into elements of a data model;

populate ontology metadata sets with extracted ontology metadata;

populate entity-relationship metadata sets by transforming metadata from the ontology metadata sets;

populate data modeling tool-specific metadata sets by transforming metadata from a generic entity-relationship metadata set; and whereby a coupling of a metadata sets and instructions makes the metadata sets self-populating, reducing the complexity of machine-readable instructions.

6. The non-transitory storage medium of claim 5, wherein the instructions populate the ontology metadata sets with extracted ontology metadata further comprise instructions that cause the one or more processors to:

retrieve ontology metadata from an ontology platform by executing SPARQL metadata queries.

7. The non-transitory storage medium of claim 5, wherein the instructions populate the ontology metadata sets with extracted ontology metadata further comprise instructions that cause the one or more processors to:

parse ontology files to retrieve ontology metadata.

8. The non-transitory storage medium of claim 5, wherein the instructions populate data modeling tool-specific modeling tool-specific metadata sets by transforming metadata from the generic entity-relationship metadata set, further comprise instructions that cause the one or more processors to:

connect to a data modeling tool;

create or open a data model specified in the configuration settings; and create elements in the data model.

9. The non-transitory storage medium of claim 7, wherein the instructions to enable a user to configure settings for a transformation of elements of the ontology into elements of a data model further comprise instructions that cause the one or more processors to enable the user to:

select, preview and modify transformation rules;

specify a scope of source ontology metadata;

review the metadata; and correct and override metadata.

10. The non-transitory storage medium of claim 5, wherein machine-readable instructions further cause the one or more processors to:

enable a user to configure settings for a transformation of elements of a data model into elements of an ontology;

populate the modeling tool-specific metadata sets with extracted data model metadata;

populate the entity-relationship metadata sets by transforming metadata from the modeling tool-specific metadata sets; and populate the ontology metadata sets by transforming metadata from the entity-relationship metadata sets; and generate SPARQL construct statements to create an ontology schema; and whereby a coupling of metadata sets and computer instructions makes said metadata sets self-populating in a reverse direction, transforming data model metadata into ontology metadata.

11. A computer-implemented method, comprising:

enabling a user to configure settings for a transformation of elements of an ontology into elements of a data model;

extracting ontology metadata and convert the ontology metadata into ontology metadata sets;

transforming the ontology metadata sets into entity-relationship metadata sets; and transforming the entity-relationship metadata sets into modeling tool-specific metadata sets;

whereby a user can transform an ontology into a data model.

12. The computer-implemented method of claim 11, wherein extracting ontology metadata and converting the ontology metadata into ontology metadata sets further comprises:

connecting to an ontology platform;

opening a source ontology specified in the configuration settings;

executing SPARQL metadata queries; and retrieving query ontology metadata.

13. The computer-implemented method of claim 11, wherein converting the ontology metadata into ontology metadata sets further comprises:

opening an ontology file or Namespace URI;

parsing the ontology to extract ontology metadata; and analyzing parsed ontology structure and populate the ontology metadata sets.

14. The computer-implemented method of claim 11, wherein transforming the entity-relationship metadata sets into modeling tool-specific metadata sets further comprises:

connecting to a data modeling tool;

creating or opening the data model specified in the configuration settings; and loading tool-specific metadata sets into the data modeling tool, creating elements in the data model.

15. The computer-implemented method of claim 11, wherein enabling a user to configure settings for a transformation of elements of the ontology into elements of a data model further comprises:

selecting, previewing and modifying transformation rules;

specifying a scope of source ontology elements;

reviewing metadata; and correcting and overriding the metadata.

16. The computer-implemented method of claim 11, further comprising:

enabling a user to configure settings for a transformation of elements of a data model into elements of an ontology;

generating a list report in a data modeling tool to populate the modeling tool-specific metadata sets;

transforming the modeling tool-specific metadata sets into entity-relationship metadata sets;

transforming the entity-relationship metadata sets into ontology metadata sets;

executing SPARQL construct statements on an ontology platform to create the ontology; and whereby a user can utilize metadata sets in a reverse direction and transform a data model into an ontology.

* * * * *